United States Patent [19]

Richards et al.

[11] Patent Number: 5,179,654
[45] Date of Patent: * Jan. 12, 1993

[54] HELP PROVISION IN A DATA PROCESSING SYSTEM

[75] Inventors: Justin J. C. Richards, Warwick; Kenneth Williams, Leamington Spa, both of England

[73] Assignee: International Business Machines Corporation, Armonk, N.Y.

[*] Notice: The portion of the term of this patent subsequent to Jun. 16, 2009 has been disclaimed.

[21] Appl. No.: 790,840

[22] Filed: Nov. 12, 1991

Related U.S. Application Data

[63] Continuation of Ser. No. 469,549, Mar. 20, 1990, Pat. No. 5,122,972.

[51] Int. Cl.⁵ .............................................. G06F 15/20
[52] U.S. Cl. .................................... 395/157; 395/161
[58] Field of Search ................................ 395/155–158, 395/160, 161, 144–149

[56] References Cited

U.S. PATENT DOCUMENTS

| | | | |
|---|---|---|---|
| 4,555,775 | 11/1985 | Pike | 364/900 |
| 4,648,062 | 3/1987 | Johnson et al. | 364/900 |
| 4,752,889 | 6/1988 | Rappaport et al. | 364/513 |
| 4,789,962 | 12/1988 | Berry et al. | 364/900 |
| 4,821,211 | 4/1989 | Torres | 364/521 |
| 4,832,283 | 4/1989 | Diehm et al. | 364/518 |
| 4,899,276 | 2/1990 | Stadler | 364/300 |
| 4,970,678 | 11/1990 | Sladowski et al. | 364/900 |

FOREIGN PATENT DOCUMENTS

| | | |
|---|---|---|
| 0056886 | 8/1982 | European Pat. Off. |
| 0171663 | 2/1986 | European Pat. Off. |
| 0249293 | 12/1987 | European Pat. Off. |
| 0273248 | 7/1988 | European Pat. Off. |

OTHER PUBLICATIONS

"Flat Hierarchical Menu," International Technology Disclosures, vol. 5, No. 1, Jan. 25, 1987.

Primary Examiner—Heather R. Herndon
Attorney, Agent, or Firm—Mark E. McBurney

[57] ABSTRACT

Help is provided to the user of a data processing system having a work station, including a display, and input means including a visible on-screen indicator and a selection means, in response to a request from the user, information on the current state of the system is used to address a store of hierarchical help text information, thereby providing contextual help text which is displayed in a separate window on the display screen alongside information related to the task in hand. A help map function is available which displays concurrently, separately from the help text, a portion of a hierarchical map of the stored help text to be replaced by new help text corresponding to the selected map entry.

21 Claims, 7 Drawing Sheets

HELP PROVISION IN A DATA PROCESSING SYSTEM

This application is a continuation of U.S. application No. 07/469,549 filed Mar. 20, 1990, now U.S. Pat. No. 5,122,972.

TECHNICAL FIELD OF THE INVENTION

The invention relates to data processing systems and to a method of providing help to a user of such a system.

BACKGROUND OF THE INVENTION

It is common practice for programmed data processing systems to provide help to an operator or user in response to a request for help. Such help is displayed to the operator at a workstation and frequently replaces the previous display screen entirely. Help may consist of actual help information or of a menu or index of possible help from which the operator is required to select an item. Such indices can be very extensive and laborious to search in themselves.

So called contextual help is known in which the help provided is not merely general to the current screen or application but is specific to the actual position of a cursor or pointer on the screen. Three related articles describing a contextual help system by R E Berry, S E Johnson et al. are found in the IBM Technical Disclosure Bulletin (Vol 27, No. 10B, March 1985 at pages 6126, 6127 and 6128). These articles show the provision of contextual help in windows on a display screen. Two types of Help panel are possible, Active and Passive. The Active panel allows the operator to make further unspecified selections from within the panel. However, no other provision for knowing what alternative help is available is made.

Another contextual help system making use of windowing capabilities is described in European patent application 0185845 A2, entitled "Help placement on a screen for a computer user". Help messages are displayed in a window which is so positioned in areas of the screen as to minimise the overlapping or obscuring of the screen content.

Also known in the provision of help to a computer user is the concept of multi-level help in which, if the initially displayed information (first level help) is inadequate, the user may request further more detailed information (second level help). Examples of systems employing multiple levels of help can be found in an article by D Koeller et al in the IBM Technical Disclosure Bulletin entitled "Improved method for Help Lookups" (Vol 29, No. 1 June 1986, P 291) and in European published patent application 0190419 A2 entitled "Method for providing an on-line help facility for interactive information handling systems".

DISCLOSURE OF THE INVENTION

The above mentioned prior art thus fails to provide easy location of alternative or related help at the same level as the contextual help initially provided.

Accordingly, the present invention provides a data processing system having a work station including a display for displaying on a screen panels of information relating to one or more tasks, the panels being viewable through windows under the control of a display manager, and operator input means by which an operator can communicate with the system interactively, the input means including indicator means for identifying items on the screen by means of a visible on-screen indicator, selection means for communicating a selection to the system on the basis of displayed information and help request means for requesting help information from the system; the system further including an addressable store of hierarchical help text information, contextual help means responsive to an appropriate request for help and to the current state of the system when help was requested to access the help text store to obtain appropriate help text and to cause the display manager to display said help text through a help text window on said screen, concurrently with the information related to the task or tasks in hand which was being displayed when help was requested, help map display means responsive to selection by said selection means to cause the display manager to display in a separate window, concurrently with said help text window, at least a portion of a hierarchical map of the stored help text, each entry of which corresponds to a unit of stored help text, and means responsive to selection of a map entry by said selection means to cause help text corresponding to the selected map entry to replace that in the help text window.

The invention also provides a method of providing help to a user of a data processing system having a work station including a display and operator input means by which an operator can communicate with the system interactively, the input means including indicator means for identifying items on the screen by means of a visible on-screen indicator, selection means for communicating a selection to the system on the basis of displayed information and help request means for requesting help information from the system; the system further including an addressable store of hierarchial help text information; the method comprising the steps of accessing the help text store in response to a request for help and to the current state of the system to obtain appropriate help text, displaying said help text concurrently with the information related to the task or tasks in hand, responding to selection of help map function by the user to display, separately from the help text but cocurrently therewith, at least a portion of a hierachical map of the stored help text each entry of which corresponds to a unit of stored help text and responding to a further selection by the user of an entry on the help map to display new help text replacing that originally displayed.

By providing a help map concurrently with the help text and application, the user is enabled, without losing track of the circumstances in which he first requested help, to consider and select alternative related help text at the same level which may be more appropriate to his needs. This does not exclude the known provision of help at different levels, in addition, such as, for example, a lower tutorial level of help.

Although selection could be made purely on the basis of a typed response to messages, it is preferable that the selection means is associated with the visible indicator so that the displayed item indicated by the indicator is selectable by operation of the selection means, This could involve selection of an item indicated by a cursor by operation of an entry key as a keyboard or could be effected with a light pen. However, the preferred implementation is a so called "mouse" device in which movement of a pointer on the display is caused by movement of the mouse. Depression of a selection button on the mouse selects the item indicated by the pointer.

In order for the contextual help means to access the help text store, it is preferred that the current state of the system be defined by a plurality of system state variables which the help means uses as addressing information. It is also preferred, that the system variables are ranked in an order corresponding to different orders of help text in the help text store. Thus, a system state defined by system variables including low order variables would result in a correspondingly low order (i.e more specific) help text whereas a system state defined only by high order variables would result in a correspondingly high order (i.e. more general) help text.

It should be noted, at this point, that the reference to help text of different order relates to the generality or specificity of the text and not to the provision of different help function at different levels of operation.

Although, in theory, the system variables could be used directly to address a help text store, it is preferred that the help text store is addressed by a key which is obtained from a key table to which the system variables are applied. The key can thus be an address actually used by the system memory whereas the system variables are essentially user or system function oriented. It will be realised that each system state, as defined by the system variables, does not necessarily correspond to a unique unit of help text. Some system states may share common help text so that addressing the key table will produce the same key.

Another preferred feature of the invention, related to the provision of contextual help, is that the low order system variables relate to the position of the indicator on the screen. Thus the corresponding low order help text can relate directly to the item or area identified by the indicator.

A convenient preferred version of this is that at least three orders of system variable are used corresponding to the application being executed, the current panel on the display screen which is owned by the application and any predefined box located within the panel. There are three corresponding orders of help text in the help store from high to low respectively.

It is also possible in some systems to have a fourth higher order of help corresponding to a system facility which owns the application.

Turning now to the help map itself, although it is possible for a static map to be stored by the system, there are advantages in generating the map dynamically from the help text store. One of these advantages is that users can add to or modify the stored help text which will immediately be reflected in the map next time it is created.

Clearly either a static or dynamic map may be too large to be viewed through the available window. It has been found preferable, where possible within the hierarchy, to select for display the map entries of the same order as the current system variables which share common higher order system variables and also to display the higher order entry represented by the common higher order variables.

If by any chance, the map entry corresponding the current system variables is not visible immediately within the help map window, the window can be scrolled or panned conventionally to reveal the remaining entries sharing the same higher order entry until the required entry is found.

Although scrolling and panning could be employed to reveal other areas of the map, it is preferable to provide a more systematic selectively operable branching mechanism for the user to move around the map. This operates so that branching may be selected on given map entries to cause display of a new help map. Where the given entry was originally one of the lower order entries, it becomes the higher order entry on the new map. Where the given entry was originally the higher order entry, it becomes one of the lower order entries on the new map.

To assist branching, the map entries preferably include icons, for example arrows, to indicate the permitted direction of branching. Where no further branching is possible from an entry, no icon is provided. The branching operation can be selected by any of the various selection techniques discussed above, the easiest being use of mouse and pointer.

Although the map offers a convenient method of navigation around the help text, it need not be the only method by which alternative text may be obtained. In a preferred version of the system, a unit of help text can include selectable branch words withing the body of the text which are associated with related units of help text. Branching to the related units of text occurs in response to selection of a selectable word by the indicator/selection means combination. The result of the branching operation is that the display manager replaces the original text in the help text window with the related text.

As a further variant on the above, a glossary store may also be provided so that, upon selection of a word of help text from which no branch is permitted, a definition of the selected word or alphabetically nearest word in the glossary store is displayed in a separate glossary window.

The invention will now be described in more detail, by way of example only, with reference to a preferred embodiment thereof as illustrated in the accompanying drawings.

BEST MODE FOR CARRYING OUT THE INVENTION

Figure 1:
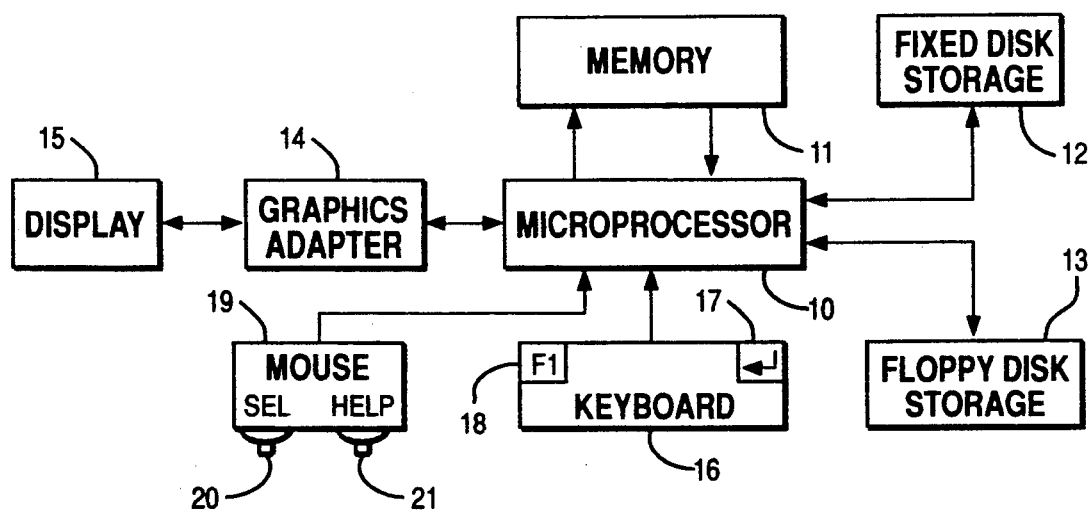
FIG. 1 is a block diagram of the major hardware components of a data processing system according to the invention.

A data processing system according to the invention comprises both hardware and software. The hardware of the system is illustrated in FIG. 1 and is conventional.

A microprocessor 10 communicates with a fixed memory 11 and with peripheral devices. These included fixed disk storage 12 and floppy disk storage 13 by way of which programs can be loaded to cause the system to execute data processing tasks. The results of there data processing tasks are displayed to an operator or user, by way of a graphics adapter 14, on a colour display 15.

Input to the system by the operator may be from keyboard 16 which has a normal range of keys, including an entry key 17 which may be used to indicate selection, and a help key 18 (labelled F1) for requesting help from the system. As an alternative to requesting selection and help from the keyboard, a mouse device 19 is also provided. Movement of the mouse causes movement of a pointer on the screen of display 15. The mouse is provided with at least two distinct buttons, one of which, 20, indicates selection of the item at which the pointer is pointing and the other of which, 21, is a request for help, whose function is exactly equivalent to operation of the F1 key on the keyboard.

The software part of the data processing system consists of normal operating software for controlling operation of the hardware and an application program which the user desires to run.

One example of suitable hardware and operating system would be an IBM PS/2 computer (models 50, 60 or 80) with an IBM OS/2 (Release 1.0) operating system (IBM is a Registered Trademark and PS/2 and OS/2 are Trademarks of International Business Machines Corporation).

Figure 2:
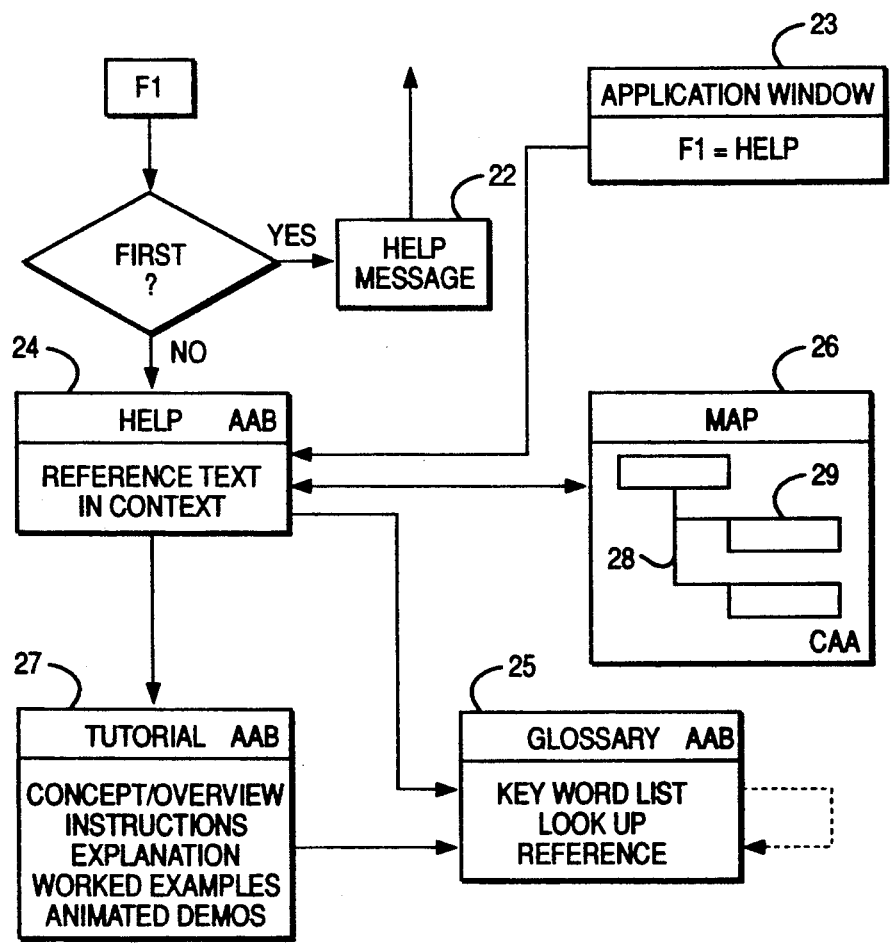
FIG. 2 illustrates schematically the help available in the preferred embodiment of a data processing system according to the invention.

The application program which is part of the data processing system of FIGS. 1 and 2 is of the multi-tasking kind in which numerous tasks can run simultaneously. It consists of general system functions and a set of basic applications that enable general data manipulation and presentation to be performed.

The system functions include two primary components, the Display Manager and the Data Store Manager. The latter manages all data used by the system which is held in Data Stores. A Data Store is single level and contains various data values and attributes as Data Items. A data dictionary provides information about the individual Data Items which are referenced by symbolic names.

The Display Manager provides full display services in all points addressable mode. It is fully integrated with the Data Store.

The display manager allows many logical screens (panels) to be presented on the physical display 15. These panels are presented through windows which may be a different size from the related panel. The windows may be displayed with or without overlap. With the exception of data entry, any of these windows may be directly employed even if they are partly hidden by another window. Data entry may only be performed on the top most window, which is identified by the presence of a data entry cursor. The Display manager presents data from the DataStore; the application does not write data to windows. All applications present their information within these windows using panels. The panel is the application's defined display layout which will be presented somewhere on the physical display through a window.

The entire screen is available to display windows which are optimally placed by the display manager. All windows have borders and may overlay one another if necessary. The user may move a window, even partially off the screen. Error and warning messages plus help information appear through Pop-up windows The physical screen is referred to as the 'desk top' and always contains a Master window giving access to all system function. The Master window occupies minimal screen space, containing a Prompt Area, Command Line and an Application Action Bar (AAB), consisting of a number of choices. Its format is as shown if FIG. 3

Figure 4:
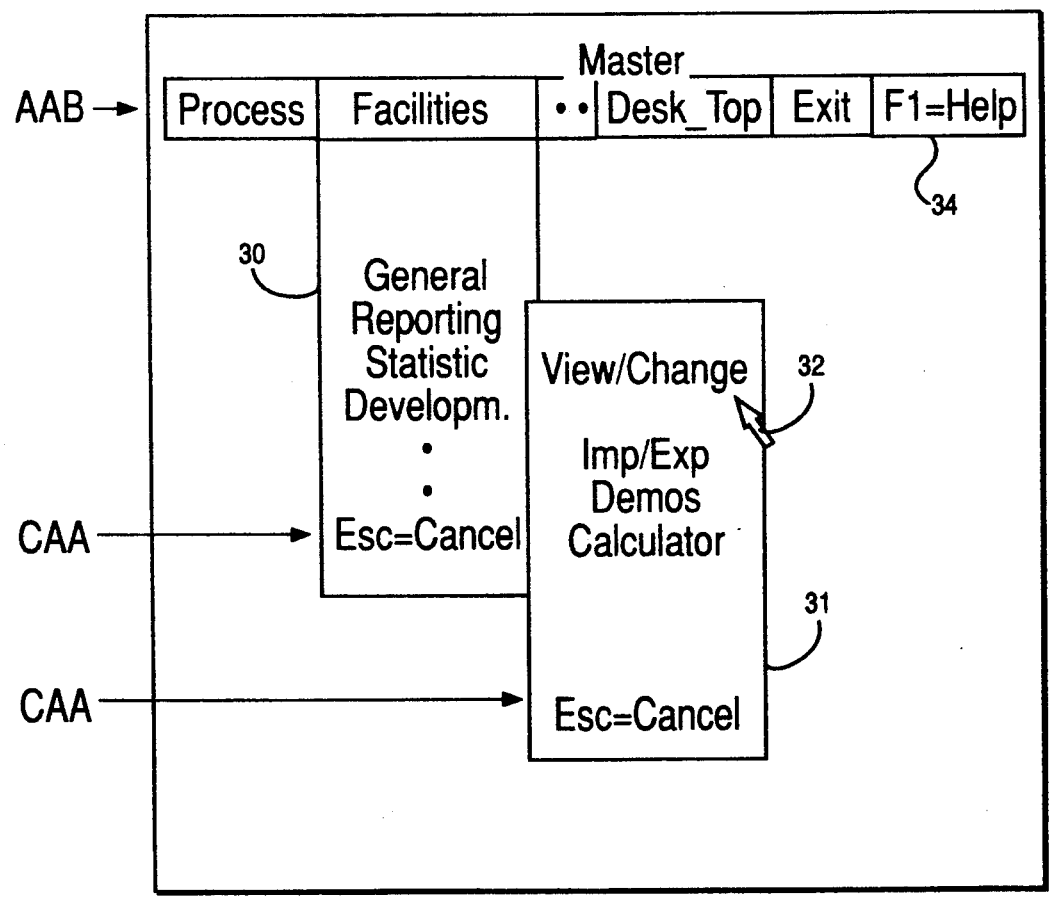
FIG. 4 illustrates a display screen layout produced in the preferred embodiment at the point of selection of a View/Change application.

The Application Action Bar choices may be selected using keyboard 16 or mouse 19. On selection they present Pull-down windows with the following services:

Process: Initiation of saved specifications, programs and procedures;

Facilities: Initiation of any enrolled application;

Data: Data Dictionary Management function are provided via a data window;

Actions: Enable the user to perform various actions, set profile information and enroll new facilities and applications;

Desk Top: Manipulation of objects on the desk top;

Exit: Close down the system and any active applications:

By way of example, and as illustrated in FIG. 4 the facilities service is accessed via the Facilities AAB choice on the Master Window. Facilities include, among others, General, Reporting, Statistics and Development as shown in the pull-down window 30 in FIG. 4 which appears on the desk top when selected by means of the mouse 17 and pointer.

Figure 3:
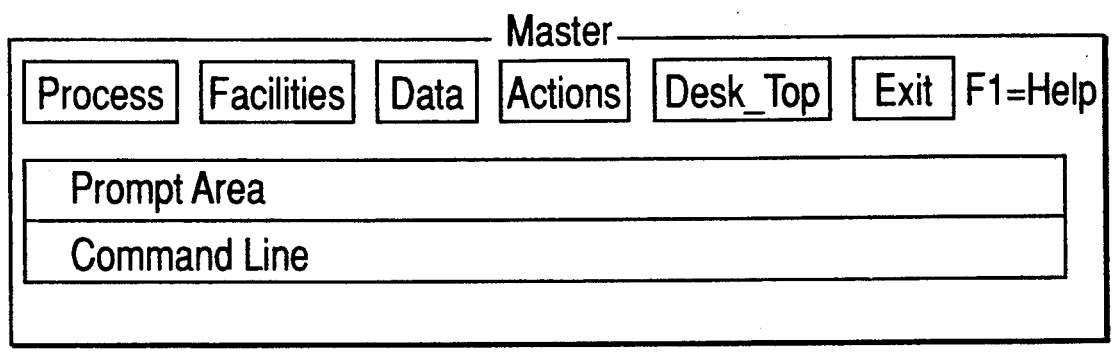
FIG. 3 illustrates the format of a Master window produced on the display in the preferred embodiment of a data processing system according to the invention.

Access to individual applications within these facilities is achieved by selection of the relevant facility. This gives a Pop-up window containing a selectable list of applications. In the example of FIG. 4 the General Facility is selected and a pop-up window 31 lists the available applications. The pointer 32 is pointed at an application called View/Change which will be used to illustrate the help facilities of the system. Noteworthy in FIGS. 3 and 4 is any area 34, in the AAB designated "F1=Help". This is an alternative way of requesting help and requires the use of the pointer to point at area 34 and the operation of the select button on mouse 19.

Common Action Areas (CAA's) at the bottom of windows 30 and 31 enable the cancellation of the current panel. CAA's, in some cases, may also contain an "F1=Help" box.

Figure 5:
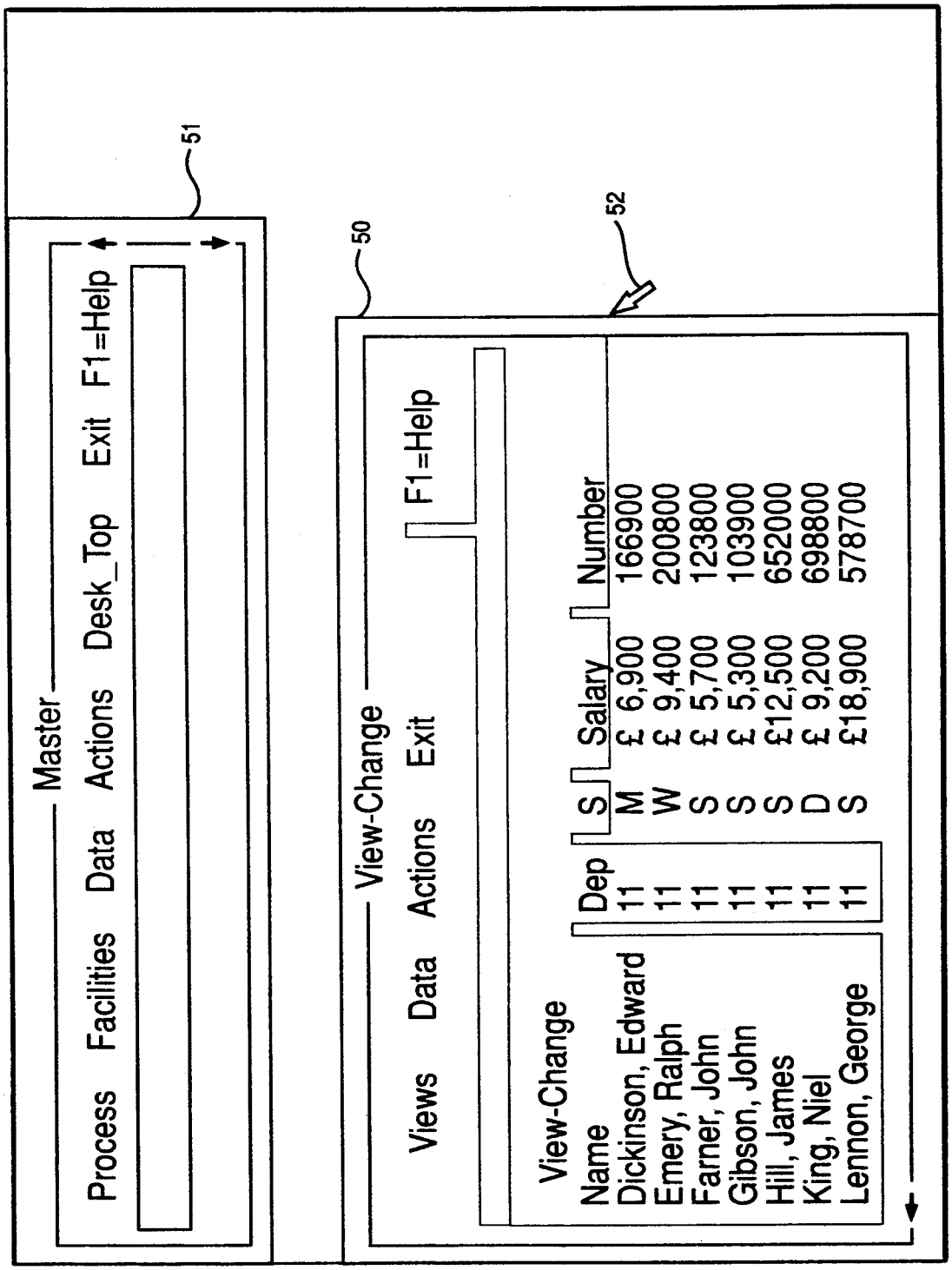
FIG. 5 shows a display screen resulting from the running of the View/Change application of FIG. 4.

As well as the Master window on the Desk Top, every application has a Main window with an Application Action Bar. An example in FIG. 5, shows a screen with the selected View-Change application in progress. In any application, Pull-down windows are presented below the AAB choice on selection. Secondary windows may be presented by the application for displaying information supplementary to that in the Main window. Pop-up windows may also be used to present very short term dialogues adjacent to a box on a Main or Secondary Window.

To assist with the description of the help function, a more precise definition of the terms "Window", "Panel" and "Box" is desirable.

Panels are virtual rectangular areas used to present information through the windows. Each panel consists of a rectangular area with a background colour, and optional foreground colour and pattern, and a set of boxes. Each panel is named.

Boxes are used to present character data or graphic objects within the panel. Each box is also rectangular and is named.

A window is a rectangular area through which panels are displayed the window is placed suitably by the Display manager unless the application specifies that the window be placed adjacent to a box in another window. During a session, users may reposition the windows if desired.

Each window is known by name to the application and the window size limit is essentially that of the panel it is displaying. A window has an initial size given by the associated panel but this may be changed by the application or 'Desk_Top' function. Windows are positioned suitably on the desk top by the system. However, the user may reposition a window. The cursor indicates the active window (for data entry purposes). Additionally, all windows have borders which clearly define the extent of the window. The top border contains a title. The border may also contain arrows that can be selected for scrolling.

Turning now to FIG. 2, a system for providing a total support environment for the user is illustrated. All the information necessary to use the system is available online, with a few exceptions. Help is available at three different levels and can be requested at any time during a session.

First level support is provided when the Help key 18 or 21 (F1) is pressed once. A message 22 is displayed within a pop-up window and relates to the area under the pointer. The help provided is associated with either the box or panel at which the pointer is directed. This first level of support provides an instant clue for the user who is momentarily puzzled, or who requires very little information to get on the right track, but will probably be of little support to users who lack an understanding of the application they are using. First level help is provided by the application concerned.

Second level support is provided by the invocation of a special Help program when the user presses the Help key (F1) twice with the pointer in the same area, or by selecting an F1=Help box in an AAB in, for example, an application window 23. Second level help takes the form of a longer piece of text displayed within a Help window 24.

The information displayed is dependent upon which application the user is in, and at what point within that application. Support is contextual. Selecting the F1=Help box displays overview information about the application or facility which owns the box.

The Help window 24 provides the additional options of selecting access to a Glossary 25 for explanations of words or phrases, access to a hierarchical map 26 of the second level help text, and access to a third level of support, the tutorial 27.

Second level support is extremely flexible. The user who understands the concepts and purpose of an application, and who invokes support for clarification of a specific point, is likely to get exactly the information he needs. The user requiring more detailed or general information than that provided can use the map browsing facilities to move up or down a hierarchical level of information. The user who is out of his depth can access the tutorial level of support to discover the concepts behind application, and get an overview of its function and the tasks it supports. Selection of third level support is by selection of a "Tutorial" box in the help window 24.

Third level support is intended for first-time users of either the system or a particular application. A tutorial is explanatory in intent. It covers principles, facilities and typical tasks. It does not cover every possible task. It may involve a two-way information flow; the user may be asked to answer question or do exercises.

The four components provided by the main Help program are Text 24, Help Map 26, Glossary 25 and Tutorial 27. The first three can be concurrently displayed on the same screen whereas a Tutorial can only be concurrent with the Glossary.

The Help Text is provided in a main window 24 with AAB which is scrollable. It is invoked through initial support selection or via the Help Map 26. The Help Text function also allows branching by selection of a selectable word to alternative Text. If there is no alternative Text, the program branches to the nearest Glossary entry.

The Help Map is controlled by a sub-program invoked through Help Map selection on the Help Text window AAB. It provides a window based graphical tree structure 28 showing related Help Text titles and selection of the related Text items 29, which appear in the window 26. The Help Map program allows scrolled movement through the tree and branching up and down the tree structure.

The Glossary is also controlled by a sub-program invoked through Glossary selection on the Help Text window or the Tutorial.It provides definitions given by selecting a keyword from the Help Text or Tutorial or by typing in the desired word. If there is no entry for the desired word, the alphabetically nearest words in the Glossary are displayed.

Tutorials are also controlled by a sub-program invoked from the Help Text window. Tutorial text is provided in a main window 27 with AAB which is scrollable. As with Help Text, Tutorials allow branching by selection to alternative Text and branching by selection to a Glossary entry. They also replay recordings for demonstrations.

The structure and operation of the Help and Help Map programs will now be explained in more detail with particular reference to the screen examples shown in FIGS. 4-8. It will be assumed that as a result of the selection of the View/Change application from the window 31 of FIG. 4, the user has retrieved the table of data of employee salary details shown in FIG. 5, which is displayed in the application window 50, beneath master window 51. It is assumed the the user wishes to change the column headed "Salary" to read "Compensation" but does not know the procedure for doing so.

Figure 8:
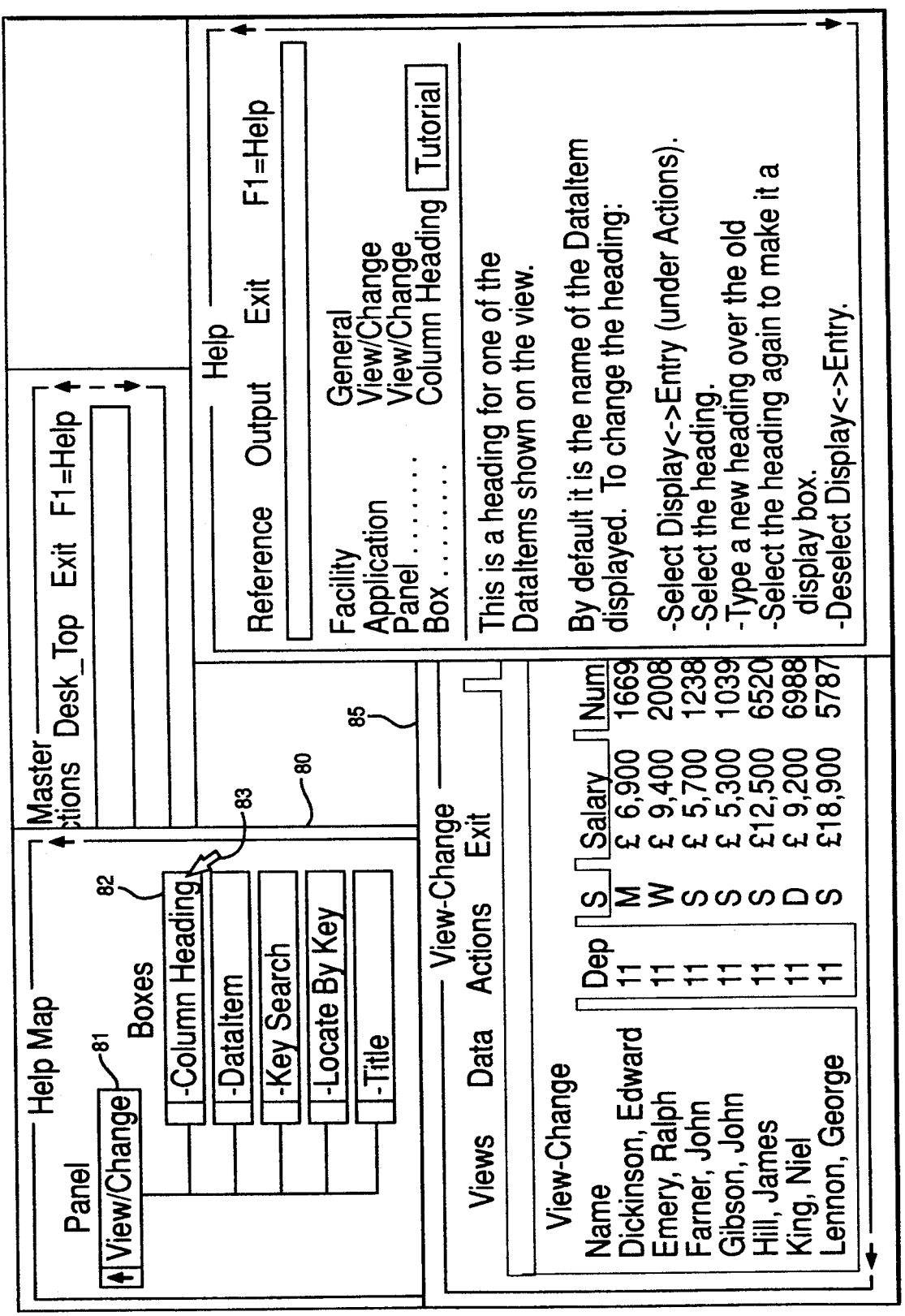

Although the experienced user would point the pointer 52 at the word "Salary" and, by pressing the F1 key twice, get the required contextual help on column headings, shown in FIG. 8, the less experienced user might well press F1 help with the pointer on the window border or in a blank area. Pressing F1 once, displays a Help message window containing the message "Select a View or Data Items to display the selected data". As this clearly does not provide the right sort of help, the user presses F1 again. This causes the View/Change application to set the system variables defining the current state of the application and to call the Help program. The system variables define the Facility, Application, Panel and Box. In the example, the first three are set to "General", "View/Change" and "View/Change" and null values are entered in the box. The name of the first panel in an application is always the same as that of the application, i.e "View/Change", though the system variable is a panel variable.

Figure 9:
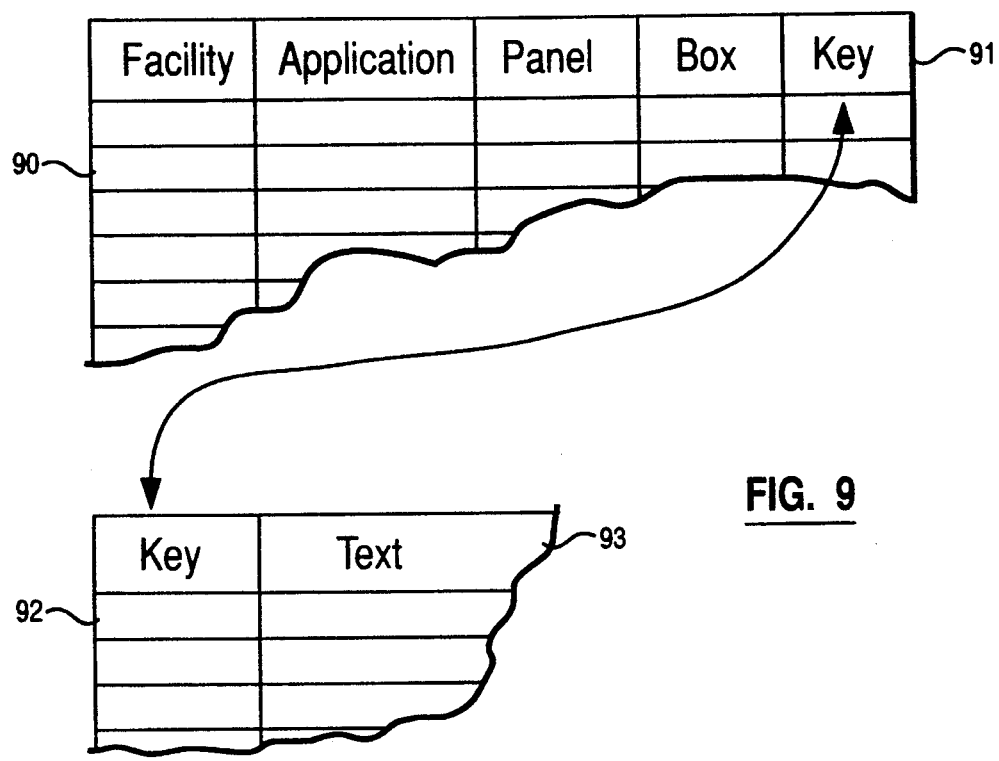
FIG. 9 shows portions of a Help Index Table and Help Text Store employed in the preferred embodiment of the invention.

The Help program opens various panels of its own, including the main Help window corresponding to 24 (FIG. 2) and interrogates the system variables to determine the subject on which help is required. A title for the Help window is created. A Help Index table 90 is then interrogated, as illustrated in FIG. 9, to extract a key value 91 corresponding to the system variables. This key is used to interrogate a Help Text table 92 to extract corresponding Help Text 93 for display in the Help Window.

Figure 6:
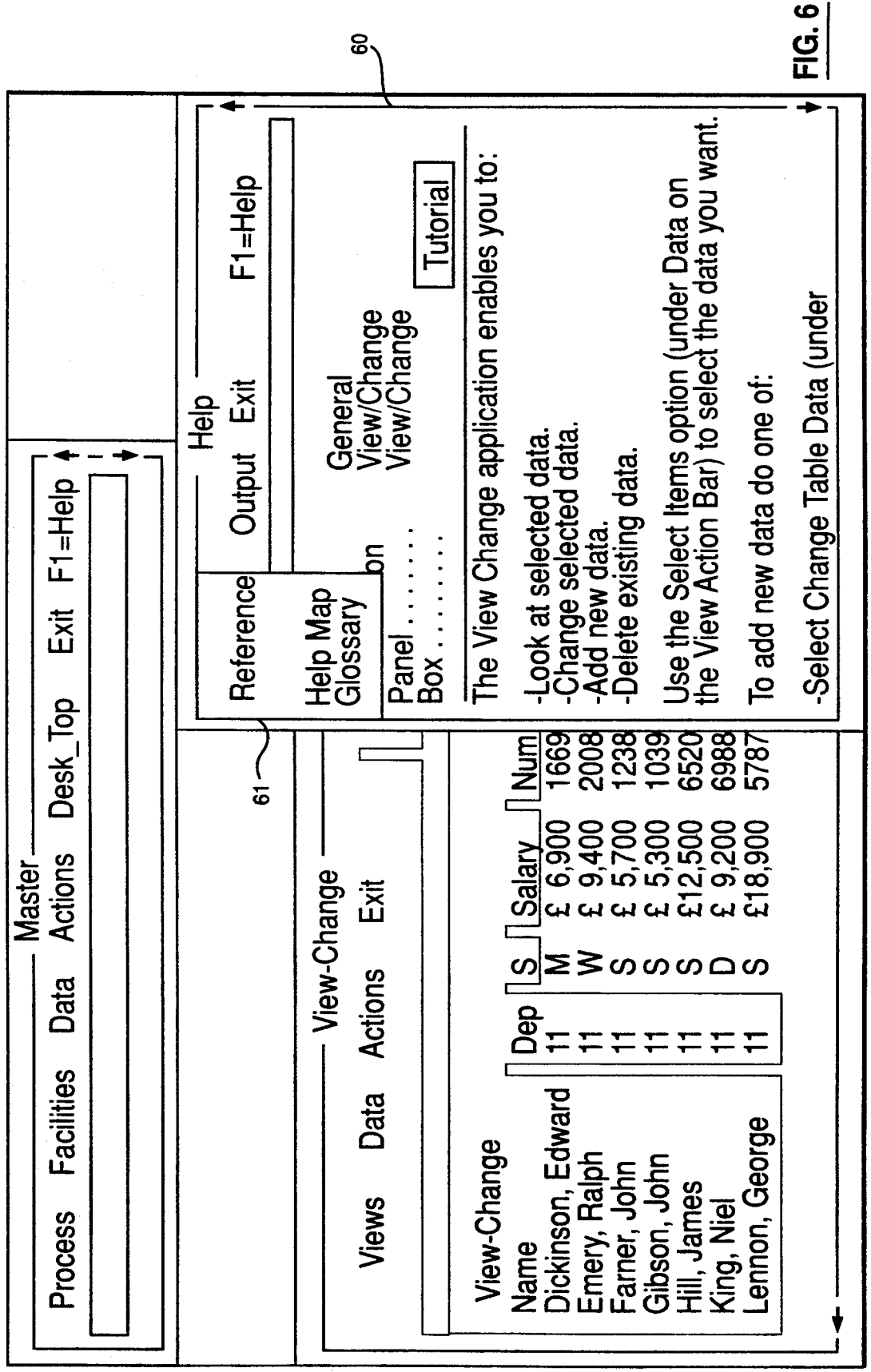
FIGS. 6–8 shows successive display screens which are produced in the preferred embodiment as a result of employing certain of the help provision illustrated in FIG. 2.

In the example, the text displayed is shown in Help window 60 in FIG. 6. This provides panel level help for the View/Change panel (which may be different from application level help). This still does not give the required information but is getting close to the subject of interest.

The user may then access the Help Map to find out what other help is available in this area. This is done by pointing the pointer at the word "Reference" in the AAB of window 60 which produces a small pull-down window 61 listing the two reference functions Help Map and Glossary. Pointing the Help Map entry and selecting it causes the display of a Help Map similar to that shown at 70 in FIG. 7.

Figure 10:
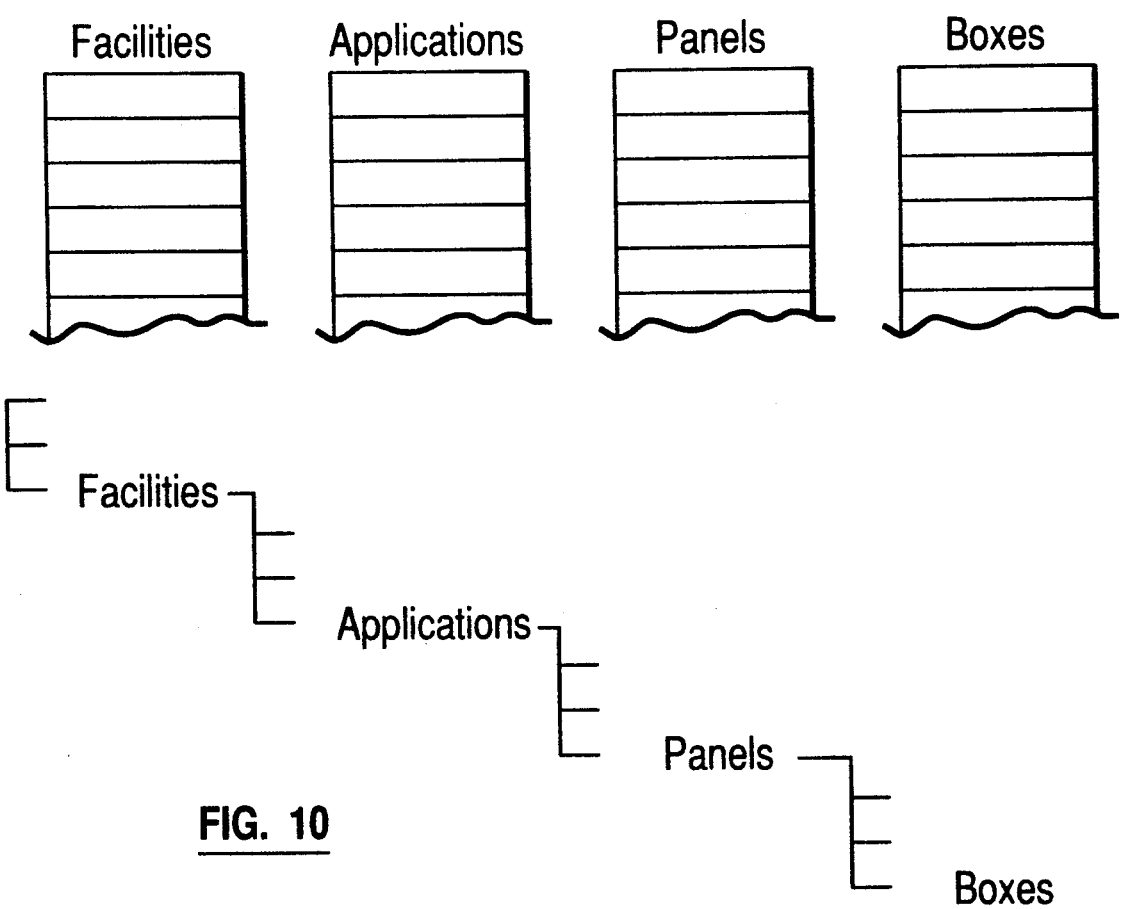
FIG. 10 illustrates schematically the creation of Help Map in the preferred embodiment of the invention.

Selection of Help Map causes a Help Map program to generate the help map by creating current lists of all Facilities, Application, Panels and Boxes. These are arranged in a tree structure as shown schematically in FIG. 10 in which higher order (or parent) entry has associated with it a number of lower order (or child) entries. The parent entry corresponding to the current system variables is determined and placed in the Help Map panel along with all child entries which share that parent. The lowest specified (i.e non-null) system variable is one of the child entries. Dynamic creation of the Help Map, as opposed to storing it statically, permits modifications and additions to the map to be made.

Figure 7:
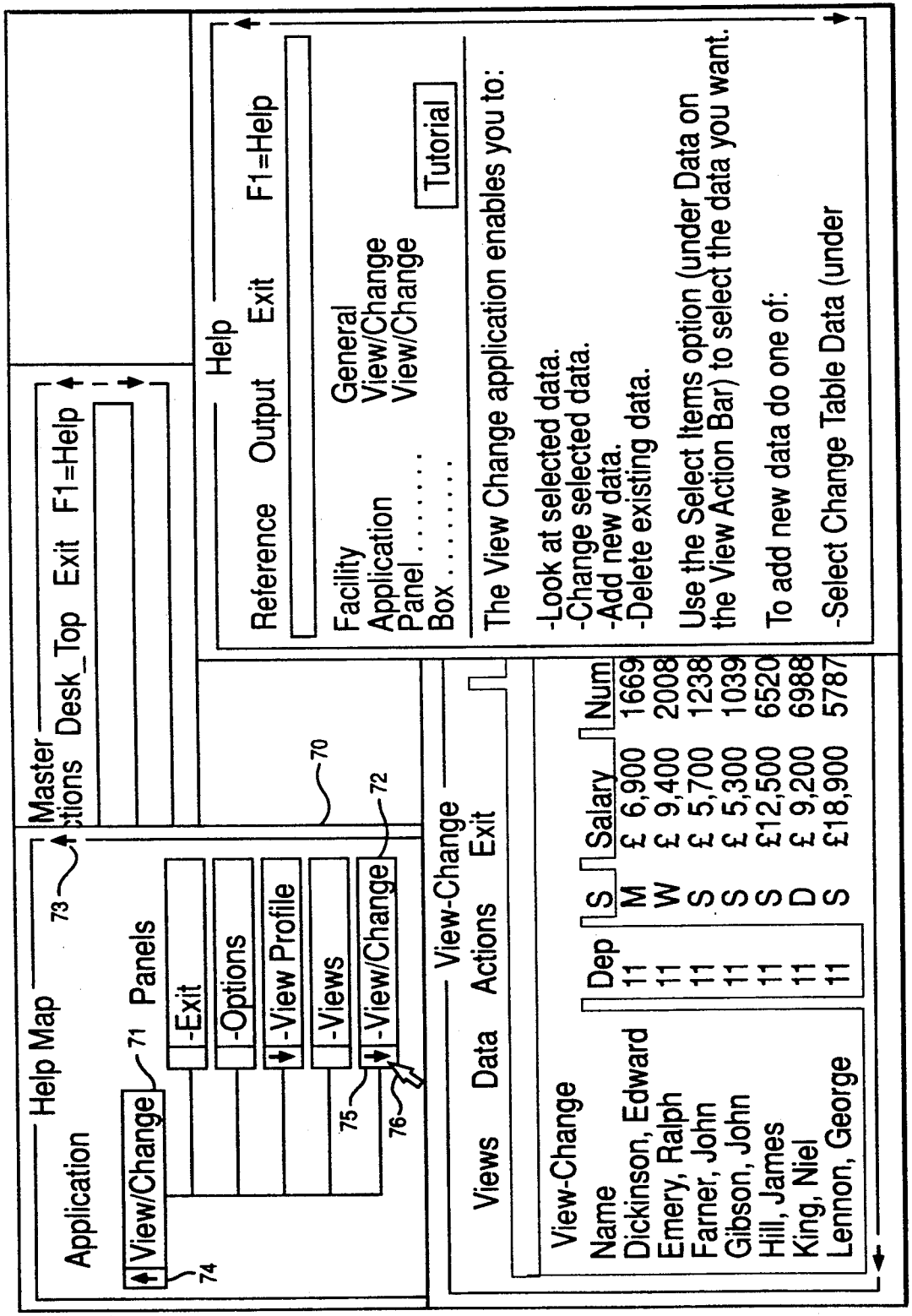

It may not always be possible to display all child entries in the Help Map window 70 and this is the case in the example chosen, the Help Map program initially displays the first five child entries in alphabetic order. Where the View/Change application entry 71 is the parent, the View/Change panel entry 72 is not one of the five initially displayed child entries. The Help Map window may however be scrolled downwardly as illustrated by arrows 73 in its border to bring the View/Change panel entry 72 into view as shown in FIG. 7.

The various entries are enclosed in boxes which include sub-boxes at their left hand margins. The presence of an arrow in the sub-box indicates that there are further portions of the help map including the particular entry. An upward arrow such as 74 indicates that a higher level of map structure is available in which the View/Change application entry is a child entry. A downward arrow such as 75 indicates a lower level of map structure is available in which the child entry, such as View/Change panel is the parent entry.

Selection of an alternative portions of the Help Map is by pointing at the branching arrow and selecting. In the present, example the pointer 76 is used to select a downward branch from the View/Change panel entry.

The Help Map program then displays the lower level Help Map portion shown in window 80 of FIG. 8. At this point the displayed help text in window is unchanged from that in window 60 in FIGS. 6 and 7.

The new help map in window 80 contains the View/Change panel entry 81 as parent, though this time with an upward branch arrow. The child entries relate to boxes within the View/Change panel and include an entry 82 entitled "Column Heading" Selection of entry 82 by pointer 83 causes the system variables to be reset to reflect those for the "Column Heading" box and the replacement of the Help Text in window 84 by new text relating to Column headings. The user now has enough information presented in the Help Text main window to enable him to make the change to the column heading "Salary" in the main application window 85.

It will be noted that the application window does not disappear when the Help Text and Help Map windows are opened, so that the user is unlikely to forget the problem which caused him to request help and can initiate the action directly.

It may also have been noted that there is an "F1=Help" area in the Help Text windows, 60 and 84, themselves. This is selectable by means of the pointer to produce help relating to the use of the Help function rather than on the subject of the text.

Help at levels above box level (i.e. panel level) may be selected by pointing and selecting blank areas and borders of the application window or the "F1=Help" area of its AAB. Help at the Application or Facility level must be selected from the appropriate display such as FIG. 3 or 4 or by branching up the map. The highest level of help is system level help obtained by branching upwards from Facility level help or by selecting contextual help on the overall application program name.

One further aspect of the help architecture of FIG. 2 is the use of branching from displayed Help Text words in the Help Text may be made selectable when it is created. Selection of such a work with the pointer causes the key to the current help text to be applied with the selected word to a Help Text Branch table. For each selectable word, the Help Text Branch table contains a Destination Key which is the key to Corresponding Help Text in the Help Text Table. The Help Text corresponding to the selected word replaces the original Help Text in the displayed window. Thus if the words "Column" or "Heading" had been predefined as selectable words in the View/Change help text of FIG. 7, selection of these words with the pointer would have produced the Column Heading help text without the need to use the Help Map.

As previously explained, if a word is not predefined as selectable, an attempt to select it results in a Glossary program being called which displays in yet another window, the selected word and its definition or the alphabetically nearest words.

Having described the principles of operation of preferred embodiment, illustrated by example, there follows a detailed description of the Help and Help Map programs.

Figure 3 or 4 or by branching up the map. The highest level of help is system level help obtained by branching upwards from Facility level help or by selecting contextual help on the overall application program name.

One further aspect of the help architecture of Figure 2 is the use of branching from displayed Help Text words in the Help Text may be made selectable when it is created. Selection of such a work with the pointer causes the key to the current help text to be applied with the selected word to a Help Text Branch table. For each selectable word, the Help Text Branch table contains a Destination Key which is the key to Corresponding Help Text in the Help Text Table. The Help Text corresponding to the selected word replaces the original Help Text in the displayed window. Thus if the words "Column" or "Heading" had been predefined as selectable words in the View/Change help text of Figure 7, selection of these words with the pointer would have produced the Column Heading help text without the need to use the Help Map.

As previously explained, if a word is not predefined as selectable, an attempt to select it results in a Glossary program being called which displays in yet another window, the selected word and its definition or the alphabetically nearest words.

Having described the principles of operation of preferred embodiment, illustrated by example, there follows a detailed description of the Help and Help Map programs.

Program Name: HELP

The Program consists of a number of "On Blocks" of code and Procedures as defined below.

Function: An application for providing in context help for a general application program. This is the master controlling task. This application is a basic system component. This task runs for the whole of a PAS session, and provides for the display
of second level help text, as well as controlling
the other tasks. This task runs continuously so
that a reasonable response time can be acheived
for the display of help text. The application
also has tasks which provide tutorials, glossary
definitions and a help map. These are all started
from this task when required. Separate tasks are
also used for output of information to OS/2 files
or printers.

Invocation: Help is started by the general application Control
when the system is started up. Thereafter,
any task may run to its QUEUE block, to request
the display of second level help on a certain
subject. This normally takes place when a task
receives a HELP event signal, following the user
pressing F1-F1 whilst the pointer is over one
of the tasks windows. First level help is
provided automatically by the system, for
the first press of F1. The subject for which
help is required is specified by settting the
variables 'S.Help.Facility', 'S.Help.Application',
'S.Help.Panel' and 'S.Help.Box' prior to
running to the QUEUE block of this task. These
variables will have default values loaded into
them by the system following an F1-F1, and often
do not need to be explicitly set by the calling
task.

Panels opened: HelpMain
HelpAABRef
HelpAABAct

HelpAABExt

ON Blocks: BREAK

DESKTOP

ERROR

HELP

QUEUE

QUIT

SCROLL

SELECT

START

STOP

| | | |
|---|---|---|
| Procedures: | DETSUBJECT | Determine help subject. |
| | EXITSELECT | 'Exit' pull-down handler. |
| | FINDKEYS | Find keys for text and tut'l. |
| | GETTEXT | Get text for specified key. |
| | GETWORD | Extract word from string. |
| | MAKETITLE | Set up title boxes. |
| | BRANCH | Branch to new piece of text. |
| | REFSELECT | 'Reference' popdown handler. |
| | ACTSSELECT | 'Output' popdown handler. |
| | QUEUESUPPORT | Queue 'Support' if possible. |
| | SETPOINTERS | Set up pointers to help data. |
| | TEXTSELECT | Handler for selects on text. |
| | TUTSELECT | 'Tutorial' button selects. |

| | |
|---|---|
| Tasks started: | I.HelpMap |
| | I.HelpGlos |
| | I.HelpPr |
| | I.HelpTut |
| | General.ShowErr |

| | | |
|---|---|---|
| Input: | I.Messages.Help | - Translatable strings used by the whole Help application, for prompts etc. |
| | General.Messages.General | - Translatable strings for general use by all | programs.

| | |
|---|---|
| User input | — From selections etc. |
| S.Help.Facility,<br>S.Help.Application,<br>S.Help.Panel,<br>S.Help.Box | — Define the subject for which help text is to be displayed. Set prior to running this tasks' QUEUE block. |
| *.HelpIndex.* | — Help index tables, which occur in DataStores which contain help text or tutorials. Used to relate the help subject, as specified in the 'S.Help.' variables, to a title, piece of help text and tutorial. |
| *.HelpText.* | — Help text tables. Used to store the pieces of help text. |
| *.HelpTxBra.* | — Help text branch tables. Used to hold the data for branches between various pieces of help text. |

Output: A screen display of help text, which may optionally be output to an OS/2 file or printer.

Process: The Help application consists of 7 modules which have the following functions:-

Help - This is the main application module. It runs continuously, and provides the main help text display function. It also controls the starting of the tutorial, help map and glossary modules. It uses a separate module to
handle the printing of help text. It provides
the variables through which all the modules
communicate to one another.

HelpMap - This module is used as a sub-task by
the Help module. It produces a help map, which
shows the user all the help text available
within the system. The help map is used in
conjunction with the main help text display.

HelpTut - This module is started as a master task
by the Help module. It prodvides a tutorial for
the user, on the specified subject. Once started
the tutorial can be used independantly of the
rest of the help system.

HelpGlos - This module is started as a master task
by the Help module. It displays glossary
definitions for words, to the user. Once started
the glossary can be used independantly of the
rest of the help system.

HelpPr - This module is started by the Help
module, as a master task. It is used to control
the printing of help te HelpTuPr - This module is started by the HelpTut
module, as a master task. It is used to control
the printing of tutorial text.

HelpGlPr - This module is started by the HelpGlos
module, as a master task. It is used to control
the printing of glossary definitions.

Errors: No error should occur during normal running of this program. Any that do are unexpected, and are passed to the 'ShowErr' program as normal.

The procedures are described below.

Procedure name:   DETSUBJECT

Function: This procedure determines the subject for which Help is required by examining the appropriate variables for data passed from the queueing task. The variables 'FacName', 'AppName', 'PanName', and 'BoxName' are set to indicate the required Help subject.

Parameters:   No

Called by:   ON QUEUE

Calls:   None

The actions performed by this procedure are as follows:-

Determine help subject.

Determine the facility, application, panel and box for which Help has been requested. All tasks which queue/run to the Help applications' ON QUEUE block pass this information in the appropriate 'S.Help.' variables. Ensure that the subject defining variables never contain unknown values.

Procedure name:   EXITSELECT

Function: This procedure is called whenever a selection is made on the 'Exit' popdown.

| | |
|---|---|
| Parameters: | No |
| Called by: | ON SELECT |
| Calls: | None |

The actions performed by this procedure are as follows:-

Exit' pull-down handler. When 'Exit Help' is selected queue to the stop block, which quiesces the application.
When 'Resume Help' is selected just remove the popdown.

| | |
|---|---|
| Procedure name: | FINDKEYS |
| Function: | This procedure checks the current datastore to see if it has a Help index table. If it does it searches this for a reference to some Help on the specified subject. If an appropriate entry is found in the Help index table the procedure returns the key to the Help Text in 'TextKey' and the Tutorial key in 'TutKey'. If either of the keys is not found it is set to 0. |
| Parameters: | Yes |
| Called by: | ON QUEUE |
| Calls: | None |

The actions performed by this procedure are as follows:-

Find keys for text and tut'l. Clear the keys. If the datastore contains a help index table with a column for help text keys. Search for an entry for the required subject in the Help index table. If no entry was found for the required subject then no Help Text key is available. If an entry was found in the index then determine the key to the Help Text. If the key does not contain a valid value then clear it. If the datastore contains a help index table with a column for tutorial keys. Search the Help index table for an entry for the specified subject. If the subject was a box then ignore the box name and find the entry relating to the panel that the box is on. This is because boxes do not have their own tutorials, but use those for the panel that they exist on. If no entry was found for the required subject then no tutorial key is available. Get the Tutorial key. If the key does not contain a valid value then clear it.

| | |
|---|---|
| Procedure name: | GETTEXT |
| Function: | This procedure checks that the current datastore contains a help text table, and if it does then it attempts to retrieve the help text specified by the key. If it is successful then this text is put into the vector 'Text' otherwise the vector is cleared. |
| Parameters: | Yes |
| Called by: | BRANCH |
| | ON QUEUE    Calls:    None |

The actions performed by this procedure are as follows:-

Get text for specified key.

Clear the vector for returning the text in.

If the datastore does not have a help text table then no help text is available.

If the specified key is invalid then no text can be found.

Search for the first line of Help Text.

If it is not found then no Help Text is available.

Retrieve the Help Text by loading lines from the Help Text table into the 'Text' vector until a line is encountered which has a different key to the required Help Text.

| | |
|---|---|
| Procedure name: | GETWORD |
| Function: | This procedure attempts to determine the word in the specified string that occurs at the specified character position within that string. If a word is found it is returned in 'Word', otherwise a null string is returned. The procedure separates words using separators defined in the string 'I.Messages.Help_13_'. |
| Parameters: | Yes |
| Called by: | TEXTSELECT |
| Calls: | None |

The actions performed by this procedure are as follows:-

Extract word from string.

Check that the values passed in the parameters are valid.

Define the separators.

If the character at the specified position is a separator then no valid word can be found.

Search for the start and end of the word, which contains the character at the specified position.

Split the word out of the string.

| | |
|---|---|
| Procedure name: | MAKETITLE |
| Function: | This procedure sets up the title for the Help Text based on the subject for which help was requested. |
| Parameters: | Yes |
| Called by: | BRANCH |

ON QUEUE

Calls: None

The actions performed by this procedure are as follows:-

Set up title boxes.

If there is no index table column containing titles, set the title to show the real facility, application, panel and box names.

Determine the facility title from the Help index table entry for the facility. If non is found use the internal system facility name. If no facility was specified then use the internal name, which is null.

Determine the application title in the same way as for the facility title.

Determine the panel title in the same way as for the facility title.

Determine the box title in the same way as for the facility title.

| | |
|---|---|
| Procedure name: | BRANCH |
| Function: | This procedure is called when it is required to branch to another piece of Help Text in the current datastore, specified by 'DKey'. The procedure checks that the piece of text exists and has an entry in the Help index table (to provide title etc), before it attempts to execute the branching operation. If the branch is successful then the flag 'BranchOK' is set, otherwise it is cleared. |
| Parameters: | Yes |
| Called by: | TEXTSELECT |
| Calls: | GETTEXT |
| | MAKETITLE |

The actions performed by this procedures are as follows:-

Branch to new piece of text.

Attempt to retrieve the new Help Text.

Then try to find an entry for it in the Help index table (which provides its title, associated facility names etc).

If both these tests pass then execute the branch:

Set the new values into the subject defining variables from the index table entry for the new Help Text.

Update the Help Text key.

Attempt to retrieve the key to any related Tutorial from the appropriate Help index table entry.

Hide or show the 'Tutorial' box, depending on whether one is available for the new subject or not.

Create the new title for the new text.

Copy the new text to the screen display.

Flag the branch as successful.

Otherwise, if either of the checks failed then flag the branch as unsuccessful.

| | |
|---|---|
| Procedure name: | REFSELECT |
| Function: | This procedure is called whenever a selection is made on the 'Reference' popdown. |
| Parameters: | No |
| Called by: | ON SELECT |
| Calls: | None |

The actions performed by this procedure are as follows:-

Reference' popdown handler.

When 'Help Map' is selected;

Set up the variables which are used to pass the Help Map subject to the Help Map subtask,..

..and either start the subtask or, if it is already active, just queue to it.

When 'Glossary' is selected;

If the 'Glossary' task is not already started,..

..set up the variables which are used to pass the Glossary subject to the Glossary task,..

!..and start it.

Hide the popdown.

| | |
|---|---|
| Procedure name: | ACTSSELECT |
| Function: | This procedure is called whenever a selection is made on the 'Output' popdown. |
| Parameters: | No |
| Called by: | ON SELECT |
| Calls: | None |

The actions performed by this procedure are as follows:-

'Output' popdown handler.

Hide the popdown.

Depending on which printing or filing option was selected set the mode for the print task accordingly.

Set the subject defining variables to be passed to the print task.

Start the Help Text print task.

| | |
|---|---|
| Procedure name: | QUEUESUPPORT |
| Function: | This procedure is called from the 'ON QUEUE' block, at the beginning of the processing of a help request. It checks to see if any of the support tasks are active, and if there are it queues to the appropriate one (providing that it is not a request from the task itself). This enables 'F1' keystroke requests to be routed to the support product when it is active, rather than producing help requests. If a support task is queued to then the flag 'SupportQd' is set, otherwise it is cleared. |
| Parameters: | No |
| Called by: | ON QUEUE |
| Calls: | None |

The actions performed by this procedure are as follows:-

Queue 'Support' if possible.

Clear the success flag.

If the help request is from 'Support' itself, then don't queue back to it.

Determine the task handle of the most appropriate active support task (if any).

If there is one queue to it. The subject is communicated to the support task via the 'S.Help.' variables, which are already set prior to queueing/ running this application.

| | |
|---|---|
| Procedure name: | SETPOINTERS |
| Function: | This procedure is called from the 'ON QUEUE' block. It determines the name of the datastore in which Help for the required subject will be found, | and sets up pointers to the columns in the help index and help text tables in the datastore. If any columns of the tables are unusable then the pointers to them are set to null strings.

Parameters: No
Called by: TEXTSELECT
Calls: None

The actions performed by this procedure are as follows:-

Set up pointers to help data.

Set all the pointers to nulls.

If a datastore is found with the same name as the specified facility then use it, else quit here.

If any of the help index table key columns is missing quit here.

Set up pointers to the help index table key columns.

Set up a pointer to the help index table help text keys column, if one exists.

Set up a pointer to the help index table tutorial keys column, if one exists.

Set up a pointer to the help index table titles column, if one exists.

If any of the help text table columns is missing quit here.

Set up pointers to the help text table text key and lines of text columns.

If any of the help text branch table columns is missing quit here.

Set up a pointer to the help text branch table destination key column.

| | |
|---|---|
| Procedure name: | TEXTSELECT |
| Function: | This procedure is called whenever a selection is made in the area that displays the Help Text in the main window (i.e. a when a word of the Help Text is selected). |
| Parameters: | No |
| Called by: | ON SELECT |
| Calls: | GETWORD<br>SETPOINTERS<br>BRANCH |

The actions performed by this procedure are as follows:-

Handler for selects on text.

Determine which word, if any, was selected.

If no valid word was selected do nothing.

If a valid word has been selected from the Help Text then check if it has been set up to cause a branch, and if it has and the branch is possible then branch to the new piece of Help Text.

Reset the pointers to the help tables in the datastore, in case either the tables or datastore have been altered.

Check that a valid Help Text branch table exists in the datastore.

Check that a branch has been set for the selected word in this piece of text.

If it has then attempt to branch to the new Help Text.

If the branch was sucessful then don't go on to provide a Glossary definition.

If a valid word was selected from the Help Text but no branch took place, then attempt to find a glossary definition for the selected word.

Set up the inter task communication variables,..

..and either start the task or, if it is already active, just queue to it.

| | |
|---|---|
| Procedure name: | TUTSELECT |
| Function: | This procedure is called whenever the 'Tutorial' button in the main window is selected. It sets up the variables which are used to pass the subject for the Tutorial and either starts or queues to the 'HelpTut' task. |
| Parameters: | No |
| Called by: | ON SELECT |
| Calls: | None |

The actions performed by this procedure are as follows:-

'Tutorial' button selects.

Set up the variables which are used to pass the Tutorial subject to the Tutorial task,..

..and either start the task or, if it is already active, just queue to it.

| | |
|---|---|
| ON Name: | BREAK |
| Function: | This block is executed whenever a BREAK occurs whilst this task is running. This can only occur during the ON START block, and causes the system to be shut down, as Help is started during the initial system startup. BREAKs are not allowed anywhere else as there are no slow processes performed. |

Calls:            None

The actions performed by this block are as follows:-

Create an outstanding BREAK event, which will be detected by Control.

Then just stop.

ON Name:          DESKTOP
Function:         This block is executed whenever a desktop
                  operation is performed in a window which is owned
                  by this task.
Calls:            None The actions performed by this block are as follows:-

Clear the prompt area.

Remove any outstanding 'ShowNote' messages.

If the desktop operation is a print or zoom then it can be ignored.

Ignore any panels which are not provided by this program, specifically
panels used for the AAB, CAA and prompt areas.

If the panel that the operation acts upon is not already recorded as
being changed then add it's name to the vector of changed panel names.

ON Name:          ERROR
Function:         This block is called whenever an execution error
                  occurs whilst this program is running.
                  The 'ShowErr' program is started to provide some
                  diagnostic information for debugging purposes, as
                  is standard practice. No errors should occur
                  during normal operation of this program, thus no
                  attempt is made to trap or handle any.
Calls:            None The actions performed by this block are as follows:-

For debugging purposes.

| | |
|---|---|
| ON Name: | HELP |
| Function: | This block is executed whenever second level help is requested in a window which is owned by this task. |
| Calls: | None |

The actions performed by this block are as follows:-

Clear the prompt area.

Remove any outstanding 'ShowNote' messages.

When Help is requested run the task like any other application.

| | |
|---|---|
| ON Name: | QUEUE |
| Function: | Programs requesting help queue to this block and set the variables S.Help.Facility, S.Help.Application, S.Help.Panel and S.Help.Box to define the level at which the Help is required and the exact subject. |
| Calls: | QUEUESUPPORT |
| | DETSUBJECT |
| | SETPOINTERS |
| | MAKETITLE |
| | FINDKEYS |
| | GETTEXT |

The actions performed by this block are as follows:-

Queue to the Support product if active, and if successful do not provide any Help.

Surface (and show if necessary) the main window.

Clear the prompt area.

Remove any outstanding 'ShowNote' messages.

Determine Help subject.

Determine the datastore that the Help Text will be found in, and set up pointers to the relevant help tables in it.

Set up the title for the display.

Search the index in the appropriate datastore for keys to the Help Text and an optional Tutorial for the specified Help subject.

Show the 'Tutorial' box if a Tutorial is available.

Attempt to get the Help Text.

Update the display with either the retrieved help text (if there is any) or a message to indicate that no help is available.

Reset the scrolling position.

| | |
|---|---|
| ON Name: | QUIT |
| Function: | This block is executed whenever a QUIT operation is performed on one of the windows owned by this task. |
| Calls: | None |

The actions performed by this block are as follows:-

Clear the prompt area.

Remove any outstanding 'ShowNote' messages.

When 'Esc=Cancel' is selected on one of the popdowns, then hide the appropriate popdown.

ON Name:         SCROLL
Function:        This block is executed whenever the main help
                 text window is scrolled.
Calls:           None The actions performed by this block are as follows:-

Clear the prompt area.

Remove any outstanding 'ShowNote' messages.

Determine how many lines of Help Text there are.

Find out how many can be displayed in the window.

Scroll the appropriate amount in the requested direction.

Limit the scrolling so that the limits of the text are not exceeded.

Put out messages if either the start or end of the text has been reached.

ON Name:         SELECT
Function:        This block is executed whenever a SELECT takes
                 place in one of the windows which is owned by
                 this task.
Calls:           TEXTSELECT
                 TUTSELECT
                 EXITSELECT
                 REFSELECT
                 ACTSSELECT The actions performed by this block are as follows:-

Clear the prompt area.

Remove any outstanding 'ShowNote' messages.

Depending on where the selection takes place, call the appropriate procedure to deal with that selection.

Selection of a word in the main text area of the main window.

Selection of the 'Tutorial' button in the main window.

A selection on the 'Exit' popdown.

A selection on the 'Reference' popdown.

A selection on the 'Output' popdown.

| | |
|---|---|
| CN Name: | START |
| Function: | This block is executed when the Help application is initialised. This is done once at system startup time, by Control. |
| Calls: | None |

The actions performed by this block are as follows:-

Enable BREAKs.

Handles for the other tasks within the application. (Set to null if task not active.) Variables used for passing data between the various tasks in the Help system.

Pointers to columns in the help index, text and text branch tables. They are set by 'SETPOINTERS' every time Help is queued to. They are set to null if not valid.

Flag set by 'QUEUESUPPORT' to indicate when the Support Help Editor has been successfully queued to.

A vector to record the names of panels changed by DeskTop.

This is the scrolling control variable for the help text displayed in the main window.

Internal system names of the facility, application, panel and box for which help has been requested.

Titles of facility, application, panel and box for which Help Text has been requested, as displayed at the top of the window. Derived from the help index table in the appropriate datastore.

Keys to the required Help Text and optionally available Tutorial.

A flag set by the 'BRANCH' procedure to indicate that an attempted branch succeeded.

Vector used for holding the required Help Text once it has been retrieved.

This is the vector which is used to display the requested Help Text in the main window.

Open panels and windows (including popdowns).

| | |
|---|---|
| ON Name: | STOP |
| Function: | This block is executed whenever Help is to be quiesced or stopped. If it is queued to from within the Help application itself then Help is merely quiesced, otherwise it is stopped. Usually Help is only stopped by Control, at the end of a session. |
| Calls: | None |

The actions performed by this block are as follows:-

If the program is to be quiesced by queueing from elsewhere within it then do that and don't stop it. Also stop the Help Map sub-task.

Otherwise the application is to be stopped (usually only when the whole system is closing down).

First, save any panels that have been changed via Desktop to the 'User' datastore.

If either Glossary, Tutorial or Help Map is active then stop them in a controlled manner (going through their TOP blocks). This is to ensure that any panels which may have been changed are saved.

Finally, stop the application level task itself.

Program Name:    HELPMAP

This program consists of a number of blocks
                 of code and procedures, as listed below Function:        This program is started as a sub-task by the
                 'Help' program, when a help map is to be
                 provided.

Invocation:      The starting task first sets up the following
                 inter-task communication variables (at the
                 application level):

A.Temp.Facility    - Define the subject for
                 A.Temp.Application   which the help map is to
                 A.Temp.Panel         be displayed. The values
                 A.Temp.Box           used are the same as
                                      those placed in the
                                      'S.Help.' variables
                                      when Help itself is
                                      called.

Having set up these variables, the starting task
                 just starts this program.

Once this task has been started, the 'A.Temp.'
                 variables can be set up and this program queued to again. This causes this program display a new help map, which is appropriate for the newly specified help subject.

| | | |
|---|---|---|
| Panels opened: | HelpMap | |
| ON Blocks: | BREAK | |
| | DESKTOP | |
| | ERROR | |
| | HELP | |
| | QUEUE | |
| | QUIT | |
| | SCROLL | |
| | SELECT | |
| | START | |
| | STOP | |
| Procedures: | SETLEVELS | Set subject levels for map. |
| | SETHEADINGS | Set titles for map levels. |
| | SETPARENT | Set up parent level of map. |
| | SETCHILDFACS | Set up child level, if fac's. |
| | SETCHILDAPPS | Set up child level, if app's. |
| | SETCHILDPANS | Set up child level, if pan's. |
| | SETCHILDBOXS | Set up child level, if boxes. |
| | UPDATEDISP | Refresh the whole help map. |
| | DOWNSEL | Down arrow select handler. |
| | UPSEL | Up arrow select handler. |
| | PARENTSEL | Parent box select handler. |
| | CHILDSEL | Child box select handler. |
| Tasks started: | General.ShowErr | |
| Input: | I.Messages.Help | – Translatable strings used by the whole Help application, for prompts etc. |

|  |  |
|---|---|
| General.Messages. | — Translatable strings for |
| General | general use by all programs. |
| User input | — From selections etc. |
| A.Temp.Facility, | — Define the subject for |
| A.Temp.Application, | which a help map is to |
| A.Temp.Panel, | be displayed. Set prior |
| A.Temp.Box | to running this tasks' QUEUE or START blocks. |
| *.HelpIndex.* | — Help index tables, which occur in DataStores which contain help text or tutorials. Used to build the help map. |

Output:   A screen display of a help map, which shows in a structured way most of the help text available.

Process:  This program is started by the main 'Help' task as a master task. It may also be queued to by it. Prior to starting or queueing it the 'A.Temp.*' variables are set up to indicate the subject around which the help map should be drawn. The user may move round the help map and select items of help text to be displayed in the main help text window. When this is done this task queues back to the main help task to get the help text displayed.

Errors:   No error should occur during normal running of this program. Any that do are unexpected, and are passed to the 'ShowErr' program as normal.

| | |
|---|---|
| Dependencies: | A help index table must be present in the system DataStore before a map can be created, as this forms the root of the map tree. |
| Procedure name: | SETLEVELS |
| Function: | This procedure inspects the variables 'FacName', 'AppName', 'PanName' and 'BoxName' to determine what the subject of the Help Map should be. It checks that the requested Help can be accessed from the top of the Help tree (i.e. it is not isolated). In cases where the Help for the required subject is isolated or non-existant the variables are modified to make the subject of the Help Map the next most relevent Help at a higher level. As well as checking the subject specifying variables, the procedure sets the variables 'ParentLevel' and 'ChildLevel', which determine what level of Help is displayed on each of the two levels of the map. |
| Parameters: | No |
| Called by: | DOWNSEL<br>UPSEL<br>ON QUEUE |
| Calls: | None |

The actions performed by this procedure are as follows:-

Set subject levels for map.

Check that the System level help is installed, and if it is not terminate the Help Map and issue an error message.

If the facility is 'System' or unspecified then system level help will be used for the subject of the Help Map, and the appropriate levels set and checking stopped here.

Determine which datastore the Help for the specifed facility will be found. If the datastore does not exist backup to the system level.

If no Help table exists in the datastore which is supposed to contain the Help for the specified facility then revert to system level Help and erase the facility name from 'FacName' etc.

Set up indirect references to the appropriate Help index table.

If no entry for facility Help exists in the appropriate table then revert to system level Help and erase the facility name from 'FacName' etc.

If Help for the specified facility exists but there is no Help at application level, then erase all lower level references from 'AppName' etc and revert to system level for the top level of the map.

If the specified subject does not go below the facility level then stop checking here and set the appropriate levels.

If no entry for application Help exists in the appropriate table then revert to facility level Help and erase the app'n name from 'AppName' etc.

If Help for the specified app'n exists but there is no Help at panel level, then erase all lower level references from 'PanName' etc and revert to facility level for the top level of the map.

If the specified subject does not go below the app'n level then stop checking here and set the appropriate levels.

If no entry for the panel Help exists in the appropriate table then revert to app'n level Help and erase the panel name from 'PanName' etc.

If Help for the specified panel exists but there is no Help at box level, then erase all lower level references from 'BoxName' and revert to application level for the top level of the map.

If the specified subject does not go below the panel level then stop checking here and set the appropriate levels.

If no entry for the box Help exists in the appropriate table then revert to panel level Help and erase the box name from 'BoxName'.

Otherwise a valid box level subject has been specified.

| | |
|---|---|
| Procedure name: | SETHEADINGS |
| Function: | This procedure sets the appropriate headings above the parent and child boxes on the panel, depending on the settings of 'ParentLevel' and 'ChildLevel'. |
| Parameters: | No |
| Called by: | UPDATEDISP |
| Calls: | None |

The actions performed by this procedure are as follows:-

Set titles for map levels.

| | |
|---|---|
| Procedure name: | SETPARENT |
| Function: | This procedure sets the appropriate title into the parent box depending on the level set for it in 'ParentLevel' and the subject of the Help Map as defined by 'FacName' etc. It also sets the uparrow if the level of the parent box is below system level. |
| Parameters: | No |
| Called by: | UPDATEDISP |
| Calls: | None |

The actions performed by this procedure are as follows:-

Set up parent level of map.

Determine which datastore the Help in the parent box is in.

Set up indirect reference to the titles column in the appropriate help index table.

Set the parent box title.

Set the up arrow if it is valid.

| | |
|---|---|
| Procedure name: | SETCHILDFACS |
| Function: | This procedure sets the titles into the child boxes when the Help to be displayed in them is at facility level. It also determines the names of the real facilities associated with each title and sets the down arrows for those facilities which have application level Help. |
| Parameters: | No |
| Called by: | UPDATEDISP |
| Calls: | None |

The action performed by this procedure are as follows:-

Set up child level, if fac's.

Clear the temporary arrays used to hold the data for the child boxes.

For each datastore active in the system.

Ignore the system datastore.

Ignore any datastore with no help index table.

Set up indirect references to columns in the appropriate Help index table.

Search for the entry for facility level help in the datastore, and if it is not found ignore the datastore.

Get the title for the facility level help.

If title is unknown or blank ignore this datastore.

If title is a duplicate ignore this datastore.

Otherwise this datastore contains valid facility level Help. The Help title and datastore name are loaded into the appropriate vectors and the entry in the down arrows vector cleared.

If the facility has application level help below it, which has a valid title and can thus be displayed on the Help Map, then set the down arrow for it.

Finally, once the data for the child boxes has been set up in the temporary arrays, sort the temporary arrays into the final arrays for the child boxes,..

..and initialise the scrolling position.

| | |
|---|---|
| Procedure name: | SETCHILDAPPS |
| Function: | This procedure sets the titles into the child boxes when the Help to be displayed in them is at application level. It also determines the names of the real applications associated with each title and sets the down arrows for those applications which have panel level Help. |
| Parameters: | No |
| Called by: | UPDATEDISP |
| Calls: | None |

The action performed by this procedure are as follows:-

Set up child level, if app's.

Determine the datastore that the app'n Help will be found in.

Clear the temporary arrays used to hold the data for the child boxes.

Set up indirect references to the appropriate Help index table.

Find no of table entries.

For each index table entry.

If the entry is for box or panel or facility level Help ignore it.

If title is unknown or blank ignore the entry.

If title is a duplicate ignore the entry.

Otherwise just load the app'n ..and initialise the scrolling help info into the appropriate position. temporary vectors and clear the down arrows vector entry.

Then, set the down arrow entry if the app'n has panel level Help below it, which has a valid title and can thus be displayed on the Help Map.

Finally, once the data for the child boxes has been set up in the temporary arrays, sort the temporary arrays into the final arrays for the child boxes,..

..and initialise the scrolling position.

Procedure name: SETCHILDPANS
Function: This procedure sets the titles into the child boxes when the Help to be displayed in them is at panel level. It also determines the names of the real panels associated with each title and sets the down arrows for those applications which have box level Help.

| | |
|---|---|
| Parameters: | No |
| Called by: | UPDATEDISP |
| Calls: | None |

The actions performed by this procedure are as follows:-

Set up child level, if pan's.

Clear the temporary arrays used to hold the data for the child boxes.

Determine the datastore that the panel Help will be found in.

Set up indirect references to the appropriate Help index table.

Find no of table entries.

Find the first entry for the application in the Help index table.

For each index table entry concerning the appropriate application.

If the entry is for box or application level Help ignore it.

If title is unknown or blank ignore the entry.

If title is a duplicate ignore the entry.

Otherwise just load the panel Help info into the appropriate temporary vectors and clear the down arrows vector entry.

Then, set the down arrow entry if the panel has box level Help below it, which has a valid title and can thus be displayed on the Help Map.

Move on to the next entry in the index table if there is one.

Finally, once the data for the child boxes has been set up in the temporary arrays, sort the temporary arrays into the final arrays for the child boxes,..

..and initialise the scrolling position.

| | |
|---|---|
| Procedure name: | SETCHILDBOXS |
| Function: | This procedure sets the titles into the child boxes when the Help to be displayed in them is at box level. It also determines the names of the real boxes associated with each title and clears the down arrows. |
| Parameters: | No |
| Called by: | UPDATEDISP |
| Calls: | None |

The actions performed by this procedure are as follows:-

Set up child level, if boxes.

Clear the temporary arrays used to hold the data for the child boxes.

Determine the datastore that the box Help will be found in.

Set up indirect references to the appropriate Help index table.

Find no of table entries.

Find the position of the first box in the index table.

For each index table entry concerning boxes on the appropriate panel.

If title is unknown or blank ignore the entry.

If title is a duplicate ignore the entry.

Otherwise just load the box Help info into the appropriate temporary vectors and clear the down arrows vector.

Move on to the next entry in the index table if there is one.

Finally, once the data for the child boxes has been set up in the temporary arrays, sort the temporary arrays into the final arrays for the child boxes,..

..and initialise the scrolling position.

| | |
|---|---|
| Procedure name: | UPDATEDISP |
| Function: | This procedure updates the Help Map display. |
| Parameters: | No |
| Called by: | DOWNSEL |
| | UPSEL |
| | ON QUEUE |
| Calls: | SETHEADINGS |
| | SETPARENT |
| | SETCHILDFACS |
| | SETCHILDAPPS |
| | SETCHILDPANS |
| | SETCHILDBOXS |

The actions performed by this procedure are as follows:-

Refresh the whole help map.

Set the headings above the parent and child boxes.

Set up the parent box and up arrow.

Set up the child boxes and down arrows (using an appropriate procedure for the level of the child box contents).

| | |
|---|---|
| Procedure name: | DOWNSEL |
| Function: | This procedure is called whenever a down arrow is selected. It sets the subject defining variables to give the appropriate next level of help down and refreshes the Help Map. |
| Parameters: | No |
| Called by: | ON SELECT |

Calls: SETLEVELS
UPDATEDISP

The actions performed by this procedure are as follows:-

Down arrow select handler. Check that the down arrow is valid.

Then, depending on the current child level set the subject defining variables to indicate the next level down..

..and refresh the map.

| | |
|---|---|
| Procedure name: | UPSEL |
| Function: | This procedure is called whenever the up arrow is selected. It sets the subject defining variables to give the next level of help up and refreshes the Help Map. |
| Parameters: | No |
| Called by: | ON SELECT |
| Calls: | SETLEVELS |
| | UPDATEDISP |

The actions performed by this procedure are as follows:-

Up arrow select handler.

Check that the up arrow is valid.

Then, depending on the current parent level set the subject defining variables to indicate the next level up..

..and refresh the map.

| | |
|---|---|
| Procedure name: | PARENTSEL |
| Function: | This procedure is called whenever the parent box on the Help Map is selected. It queues to the Help master task with a request to display the |

Help Text for the subject which corresponds to
the parent title.

| | |
|---|---|
| Parameters: | No |
| Called by: | ON SELECT |
| Calls: | None |

The actions performed by this procedure are as follows:-

Parent box select handler.

Depending on the level of the parent box set the appropriate data into the variables which are normally set before queueing Help,..

..and queue to the Help application just like a normal request.

| | |
|---|---|
| Procedure name: | CHILDSEL |
| Function: | This procedure is called whenever a child box on the Help Map is selected. It queues to the Help master task with a request to display the Help Text for the subject which corresponds to the child title. |
| Parameters: | No |
| Called by: | ON SELECT |
| Calls: | None |

The actions performed by this procedure are as follows:-

Child box select handler.

Check that the child box has a valid title in it.

Depending on the level of the child boxes set the appropriate data into the variables which are normally set before queueing Help,..

..and queue to the Help application just like a normal request.

| | |
|---|---|
| ON Name: | BREAK |

| | |
|---|---|
| Function: | This block is executed whenever a BREAK occurs whilst this task is running. This only occurs during the ON START block, and causes this task to stop. BREAKs are not allowed anywhere else, as there are no slow operations. |
| Calls: | None |

The actions performed by this block are as follows:-

Flag the Help Map as stopped, and stop.

| | |
|---|---|
| ON Name: | DESKTOP |
| Function: | This block is executed whenever a desktop operation is performed in a window which is owned by this task. |
| Calls: | None |

The actions performed by this block is as follows:-

If the panel is changed via DeskTop then record the fact so that it can be saved away when the subtask is stopped.

| | |
|---|---|
| ON Name: | ERROR |
| Function: | This block is called whenever an execution error occurs whilst this program is running. The 'ShowErr' program is started to provide some diagnostic information for debugging purposes, as is standard practice. No errors should occur during normal operation of this program, thus no attempt is made to trap or handle any. |
| Calls: | None |

The action performed by this block is as follows:-

For debugging purposes.

| | |
|---|---|
| ON Name: | HELP |

Function:        This block is executed whenever second level
                 help is requested in a window which is owned by
                 this task.
Calls:           None.

The action performed by this block is as follows:-

When help is requested just run the task like any other application.

ON Name:         QUEUE
Function:        Tasks queue to this block to refresh the Help Map
                 so that it is set up for a particular subject.
                 It determines the level of help to be shown on
                 each of the two levels of the map and the
                 specific subject around which the map should be
                 based.
Calls:           SETLEVELS The actions performed by this block are as follows:-

Determine the intended subject of the help map (these must never become unknown). The 'A.Temp.' variables are always cleared after usage.

Determine the levels of help to be displayed at each of the map levels. Update the map display with the info for the appropriate levels and subject.

Surface the window.

ON Name:         QUIT
Function:        This block is executed whenever a QUIT operation
                 is performed on one of the windows owned by this
                 task.
Calls:           None The action performend by this block is as follows:-

When 'Esc=Cancel' is selected terminate the task.

ON Name: SCROLL
Function: This block is executed whenever the help map window is scrolled.
Calls: None The actions performed by this block are as follows:-

Determine how many child titles there are.

Find out how many can be displayed in the window.

Scroll the appropriate amount in the requested direction.

Limit the scrolling to ensure that the ends of the data are not exceeded and hide and show the boxes which indicate if there is more data in either direction.

ON Name: SELECT
Function: This block is executed whenever a SELECT takes place in one of the windows which is owned by this task.
Calls: · UPSEL
DOWNSEL
PARENTSEL
CHILDSEL The action performed by this block is as follows:-

Depending on where the select takes place on the Help Map, call an appropriate procedure to deal with it.

ON Name: START
Function: This block is executed when the Help Map part of the help application is started. This is usually when the 'Help Map' button on the main help text 'Reference' pull-down has been selected.
Calls: None The actions performed by this block are as follows:-

Enable BREAKs.

This is the scrolling control variable for the child boxes on the help map.

Flag to record if the panel has been changed via 'DeskTop'.

Internal system names of the facility, application, panel and box for which a Help Map has been requested.

Level of help for each of the two levels of the help map. ( May be 'System', 'Facility', 'Application', 'Panel', or 'Box'.)

The titles of the help at the higher and lower levels of the Help Map, as displayed in the appropriate boxes.

The real names of the entities whose titles are displayed in the child boxes.

The arrows that indicate if the user can move up or down the map from a given item.

Open panel and window.

Queue to the 'ON QUEUE' block to refresh the display.

| | |
|---|---|
| ON Name: | STOP |
| Function: | This block is executed whenever the program is to be stopped. This is usually by queueing from elsewhere within it, e.g. from the code which handles the 'Esc=Quit' button. |
| Calls: | None |

The actions performed by this block are as follows:-

When stopping..

..save the panel if it has been changed via DeskTop,..

..flag the Help Map as stopped,..

..and stop.

We claim:

1. A data processing system comprising:
   means for displaying panels of information relating to at least one task, the panels being viewable through at least one window;
   operator input means for providing interactive communication with the system including means for identifying the displayed information including a visible indicator, viewable on said display means for identifying selectable information;
   means for communicating, associated with said visible indicator, an operator selection to the system and, for requesting help information from the system;
   an addressable store of hierarchical help text information;
   contextual help means responsive to a request for help and to a current state of the system, defined by plural system state variables, to access the help text store and obtain appropriate help text and display said help text through one of said windows, said system state variables being ranked based on the current system state, and hierarchical help text information having corresponding help text is displayed such that specific system state variables are associated with low order help text and often system state variables are associated with high order help text;
   help map display means for displaying in a separate window, concurrently with said help text and information relating to the at least one task, at least a portion of a hierarchical map of the stored help text corresponding to a current one of the system state variables; and
   means for replacing the help text in the help text window with help text corresponding to the a selected entry from said help map.

2. A system according to claim 1 wherein said system variables are applied as addressing information to a key table to produce a key which is an address for accessing a unit of help text in said help text store.

3. A system according to claim 2 wherein said system variables comprise:
   a panel order of help text, corresponding to the displayed panel of information in which said indicator is located;
   a low order system state variable, associated with said low order help text, that corresponds to the location of the indicator within a predefined box in the displayed panel of information;
   a high order system state variable, associated with said high order help text, that corresponds to a program application responsible for displaying the panel of information; and
   a facility order of help text that has a higher system state variable than said high order system state variable.

4. A system according to claim 3 wherein said help map display means comprises selectively operable branching means for causing display of a new help map after selection of a branching function for a given map entry that is a low order system state variable or high order system state variable.

5. A system according to claim 4 wherein said displayed map entries comprise icons, indicating the permitted direction of branching, selectable by the operator via said operator input means when said visible indicator is positioned on one of said icons.

6. A system according to claim 5 further comprising help text branching means, responsive to the selection of selectable branch words included within the body of said help text being currently displayed, for accessing related help text in the help text store, for replacing the original help text with said related help text, and for displaying said related help text.

7. A system according to claim 6 further comprising a glossary store wherein selection of a help text word, other than said selectable branch words, cases display of a glossary window containing a definition of the selected word or the alphabetically nearest words.

8. A method of presenting help information in a data processing system, comprising:
   displaying panels, viewable through a window, of information relating to at least one task;
   providing interactive operator communication with said data processing system,
   providing an addressable store of hierarchical help text information by identifying items displayed on a screen of a display within said data processing system by selecting said items with a variable indicator, communicating the operator selected items to the data processing system and requesting help information from the data processing system;
   obtaining and displaying appropriate help text from said addressable store;
   concurrently displaying said appropriate help text, the information relating to the at least one task and at least a portion of a hierarchical help map, corresponding to a current state of said system as defined by plural system state variables, said system state variables being ranked based on the current system state and hierarchical help text information, associated with said hierarchical help map, having corresponding help text displayed such that specific system state variables are associated with low order help text and other system state variables are associated with high order help text; and replacing the help text currently displayed with help text corresponding to a selected entry from said hierarchical help map.

9. A method according to claim 8 wherein said step of concurrently displaying help text, comprises addressing a key table using said system state variables to produce a key which is an address for accessing a unit of help text in said help text store.

10. A method according to claim 9 wherein said step of concurrently displaying system state variables comprises:
- displaying a panel order of help text, corresponding to the displayed panel of information in which said indicator is located;
- displaying a low order system state variable, associated with said low order help text, that corresponds to the location of the indicator within a predetermined box in the displayed panel of information;
- displaying a high order system state variable, associated with said high order help text, that corresponds to a program application responsible for displaying the panel of information; and
- displaying a facility order to help text that has a higher system state variable than said high order system state variable.

11. A method according to claim 10 wherein said step of providing interactive operator communications, comprises causing display of a new help map after section of a branching function for a given map entry that is a low order system state variable or high order system state variable.

12. A method according to claim 11 wherein said step of concurrently displaying said help text comprises displaying icons, indicating the permitted direction of branching, selectable by the operator when said visible indicator is positioned on one of said icons.

13. A method according to claim 12 further comprising:
- accessing related help text in the help text store;
- replacing the original help text with said related help text; and
- displaying said related help text.

14. A method according to claim 13 further comprising providing a glossary store wherein selection of a help text word, other than said selectable branch words causes display of a glossary window containing a definition of the selected word or the alphabetically nearest words.

15. A computer program implanted on a data processing system and for controlling said data processing system to display help information to a user of said system, comprising:
- means for displaying panels, viewable through a window, of information relating to at least one task;
- interactive operator communication means for providing operator input to said data processing system to identify items displayed on a display screen within said data processing system by selecting said display items, to communicate the selected items to said data processing system and for requesting help information from the data processing system;
- an addressable store of hierarchical help text information;
- means for obtaining and displaying appropriate help text from said addressable store;
- means for concurrently displaying said appropriate help text, information relating to the at least one task and at least a portion of a hierarchical help map, corresponding to a current state of said system as defined by plural system state variables, said system state variables being ranked based on the current system state and hierarchical help text information having corresponding help text is displayed such that specific system state variables are associated with low order help text and specific system state variables are associated with high order help text; and
- means for replacing the help text currently displayed with help text corresponding to a selected entry from said hierarchical help map.

16. A computer program according to claim 15 wherein said means for concurrently displaying help text, comprises means for addressing a key table using said system state variables to produce a key which is an address for accessing a unit of help text in said help text store.

17. A computer program according to claim 16 wherein said means for concurrently displaying system state variables comprises:
- means for displaying a panel order to help text, corresponding to the displayed pane of information in which said indicator is located;
- means for displaying a low order system state variable, associated with said low order help text, that corresponds to the location of the indicator within a predetermined box in the displayed panel of information;
- means for displaying a high order system state variable, associated with said high order help text, that correspond to a program application responsible for displaying the panel of information; and
- means for displaying a facility order of help text that has a higher system state variable than said high order system state variable.

18. A computer program according to claim 17 wherein said interactive operator communication means, comprises means for causing display of a new help map after selection of a branching function for a given map entry that is a low order system state variable or high order system state variable.

19. A computer program according to claim 18 wherein said means for concurrently displaying said help text comprises means for displaying icons, that indicate the permitted direction of branching, said icons being selectable by an operator when said visible indicator is positioned on one of said icons.

20. A computer program according to claim 19 further comprising:
- means for accessing related help text in the help text store;
- means for replacing the original help text with said related help text; and
- means for displaying said related help text.

21. A computer program according to claim 20 further comprising a glossary store wherein selection of a help text word, other than said selectable branch words causes display of a glossary window containing a definition of the selected word or the alphabetically nearest words.

* * * * *

(12) REEXAMINATION CERTIFICATE (4339th)
United States Patent
Richards et al.

(10) Number: US 5,179,654 C1
(45) Certificate Issued: *May 8, 2001

(54) HELP PROVISION IN A DATA PROCESSING SYSTEM

(75) Inventors: Justin J. C. Richards, Warwick; Kenneth Williams, Leamington Spa, both of (GB)

(73) Assignee: International Business Machines Corporation, Armonk, NY (US)

Reexamination Request:
No. 90/004,237, May 3, 1996

Reexamination Certificate for:
Patent No.: 5,179,654
Issued: Jan. 12, 1993
Appl. No.: 07/790,840
Filed: Nov. 12, 1991

(*) Notice: This patent is subject to a terminal disclaimer.

Related U.S. Application Data

(63) Continuation of application No. 07/469,549, filed on Mar. 20, 1990, now Pat. No. 5,122,972.

(51) Int. Cl.⁷ .................................................. G06F 17/60
(52) U.S. Cl. ........................... 345/338; 345/340; 345/348
(58) Field of Search ................................. 395/157, 160, 395/353, 155, 156, 158, 161, 336–346, 352–357; 345/336–346, 352–357

(56) References Cited

U.S. PATENT DOCUMENTS

| | | | |
|---|---|---|---|
| 4,430,725 | 2/1984 | Elliott et al. | 395/772 |
| 4,434,475 | 2/1984 | McCaskill et al. | 395/352 |
| 4,435,777 | 3/1984 | McCaskill et al. | 395/793 |
| 4,451,900 | 5/1984 | Mayer et al. | 395/789 |
| 4,459,678 | 7/1984 | McCaskill et al. | 395/326 |
| 4,507,753 | 3/1985 | McCaskill et al. | 395/769 |
| 4,521,851 | 6/1985 | Trubisky et al. | 395/394 |
| 4,556,954 | 12/1985 | Advani et al. | 395/761 |
| 4,618,858 | 10/1986 | Belch | 395/342 X |
| 4,622,013 * | 11/1986 | Cerchio | 434/118 |

(List continued on next page.)

FOREIGN PATENT DOCUMENTS

| | | |
|---|---|---|
| 1278103 | 12/1990 | (CA) . |
| 1291272 | 10/1991 | (CA) . |
| 1306066 | 8/1992 | (CA) . |
| 0 056 886 * | 1/1981 | (EP) . |
| 056-886 | 8/1982 | (EP) . |
| 63-103371 | 5/1988 | (JP) . |

OTHER PUBLICATIONS

Helander (ed.),Handbook of Human–Computer Interaction, 1988, p. xvii–xxxiii, 123–133, 345–364, 413–436.*
Sondheimer, Human Factors and User Assistance in Interactive Computing Systems: An Introduction, IEEE Transactions on Systems, Man and Cybernetics,v.SMC–12, n.2. Mar./Apr. 1982, p. 102–107.*
Fenchel, Self Describing Systems Using Integral Help, IEEE Transactions on Systems, Man and Cybernetics, v.SMC–12, n.2. Mar./Apr. 1982, p. 162–167.*
Barrett (ed.), Text, Context and Hypertext, 1987, p. 301–306.*
American Management Systems, Directory Shell User Manual, Dec. 1986.*
Kearsley et al., Designing Interactive Software, 1985, p. 62–70.*

(List continued on next page.)

Primary Examiner—Anton W Fetting

(57) ABSTRACT

Help is provided to the user of a data processing system having a work station, including a display, and input means including a visible on-screen indicator and a selection means, in response to a request from the user, information on the current state of the system is used to address a store of hierarchical help text information, thereby providing contextual help text which is displayed in a separate window on the display screen alongside information related to the task in hand. A help map function is available which displays concurrently, separately from the help text, a portion of a hierarchical map of the stored help text to be replaced by new help text corresponding to the selected map entry.

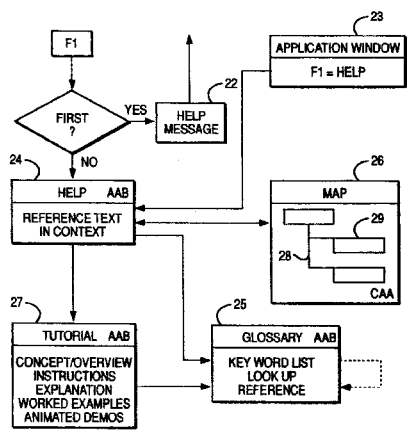

U.S. PATENT DOCUMENTS

| | | | |
|---|---|---|---|
| 4,642,790 | | 2/1987 | Minshull et al. .................... 395/341 |
| 4,686,522 | | 8/1987 | Hernandez et al. ............. 395/347 X |
| 4,688,167 | | 8/1987 | Agarwal ............................... 395/343 |
| 4,752,889 | | 6/1988 | Rappaport et al. .................... 395/12 |
| 4,772,882 | | 9/1988 | Mical ............................... 395/347 X |
| 4,779,080 | | 10/1988 | Coughlin et al. ................ 395/352 X |
| 4,783,759 | | 11/1988 | Borgendale et al. ................ 395/347 |
| 4,791,556 | | 12/1988 | Vilkaitis ............................... 395/348 |
| 4,821,211 | * | 4/1989 | Torres ................................. 395/353 |
| 4,823,283 | | 4/1989 | Diehm et al. ........................ 395/352 |
| 4,845,644 | | 7/1989 | Anthias et al. ...................... 395/343 |
| 4,965,741 | * | 10/1990 | Winchell et al. ...................... 395/12 |
| 4,992,972 | * | 2/1991 | Brooks et al. ........................ 395/155 |
| 5,086,513 | | 2/1992 | Lawrence et al. ................ 455/186.1 |
| 5,109,433 | | 4/1992 | Notenboom .......................... 382/240 |
| 5,157,768 | | 10/1992 | Hoeber et al. ........................ 395/338 |
| 5,201,047 | * | 4/1993 | Maki et al. ........................... 395/600 |
| 5,241,671 | * | 8/1993 | Reed et al. ........................... 395/600 |
| 5,287,448 | | 2/1994 | Nicol et al. ........................... 395/337 |

OTHER PUBLICATIONS

Soucie, Corporate Consolidation, PC World,Oct. 1987, p. 170–177.*

Gries, Compiler Construction for Digital Computers, 1971, p. 175–178.*

Charland, The Application System 400 Help Facility—Design Philosophy and Considerations, IBM Systems Journal, p. 424–442,1989.*

Carroll et al., Interface Design Issues for Advice–Giving Expert Systems, Communications of the ACM, v.30,n.1, p. 14–31, Jan. 1987.*

Houghton,Jr., Online Help Systems: A Conspectus, Communications of the ACM, v.27,n.2, p. 126–133, Feb. 1984.*

Foley et al., Fundamentals of Interactive Computer Graphics, p. 184–186, 234–239, 1984.*

Good et al., Building a User Derived Interface, Communications of the ACM, v.27,n.10, p. 1032–1043, Oct. 1984.*

Stefik et al., Beyond the Chalkboard: Computer Support for Collaboration and Problem Solving in Meetings, Communications of the ACM, v.30,n.1, p.32–47, Jan. 1987.*

Harel, On Visual Formalism, Communications of the ACM, v.31,n.5, p.514–530, May 1988.*

Carroll et al., Training Wheels in a User Interface, Communications of the ACM, v.27,n.8, p.800–806, Aug. 1984.*

Brown et al., Converting Help Systems to Hypertext, Software–Practice and Experience, v.18(2),p. 163–165, Feb. 1988.*

Ferranti, IBM Adds Polish to Platinum Line With New Interface, PC Week, v.7, n.11, p.12, Mar. 19, 1990.*

W.K. English, D.C. Engel bart & M.L. Berman, Display–Selection Techniques for Text Manipulation, IEEE Transactions on Human Factors in Electronics, vol. HFE–8, No. 1 (Mar. 1967).

David Gries, *Compiler Construction for Digital Computers* (1971).

Daniel Carl Swinehart, Copilot: A Multiple Process Approach to Interactive Programming Systems, Stanford Artificial Intelligence Laboratory Report (Jul. 1974).

Alan Kay and Adele Goldberg, *Personal Dynamic Media* (Mar. 1977).

Alan Borning, The Programming Language Aspects of ThingLab, a Constraint–Oriented Simulation Laboratory in ACM Transactions on Programming Languages and Systems, vol. 3, No. 4 (Oct. 1981).

N.K. Sondheimer and N. Relles, Human Factors and User Assistance in Interactive Computing Systems: An Introduction, IEEE Transactions on Systems, Man, and Cybernetics, vol. SMC–12, No. 2, p. 102 (Mar./Apr. 1982).

R. S. Fenchel and G. Estrin, Self–Describing Systems Using Integral Help, IEEE Transactions on Systems, Man, and Cybernetic, vol. SMC–12 No. 2, p. 162 (Mar./Apr. 1982).

Greg Kearsley & Robin Halley, *Designing Interactive Software,* pp. 63–69 (1985).

American Management Systems, Inc., Departmental Systems Group Directory Shell, Version 1.38 (user manual (Dec. 1986).

FASTAR and Control/PC head to head, PC World, p. 176 (Oct. 1987).

New DAC–Easy Word II (advertisement), PC World (Oct. 1987).

WordTech Systems, Inc., dBXL (advertisement), PC World, p. 125 (1987).

Patricia A. Billingsley, Taking Panes: Issues in the Design of Windowing Systems in Handbook of Human–Computer Interaction, pp. 413–415 (M. Helander ed., 1988).

Philip Rubens and Robert Krull, Designing Online Information in Text, Context, and Hypertest; Writing with and for the Computer, pp. 301–306 (E. Barrett ed., 1988).

Elkerton, Online Aiding for Human–Computer Interfaces in Handbook of Human–Computer Interaction, pp. 345–364 (M. Helander ed.., 1988).

J.E. Ziegler and K.P. Fahnrich, Direct Manipulation in Handbook of Human–Computer Interaction, pp. 123–129 (M. Helander ed., 1988).

Geri Younggren, Using Object Oriented Programming Language to Create Audience–Driven Hypermedia Environments in Text, Context, and Hypertext: Writing with and for the Computer, pp. 80–82 (E. Barretted., 1988).

D. A. Charland, The Application System/400 help facility—design philosophy and considerations, IBM Systems Journal vol. 28, No. 3 (1989).

J. Nielsen, Multimedia and Hypertext: The Internet and Beyond (1995).

Adele Goldberg and David Robson, *A Metaphor for Under Interface Design,* Xerox Palo Alto Research Center Learning Research Group.

IBM Technical Disclosure Bulletin, Online Assistance, vol. 28, No. 6, Nov., 1985, pp. 2293–2294.

Clifford Burgess, UNIX and ADA—Local Area Networks, Helping Users Use Unix, Computers and Industrial Engineering, vol. 15, pp. 244–248 (1988).

N. Paz, W. Leigh and R. Yim, Using Graphical Study Trees to Present HELP Knowledge, Microcomputers for Information Management, Mar., 1989, pp. 47–67.

* cited by examiner

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–21 is confirmed.

* * * * *